US011414992B2

(12) United States Patent
Georgitzikis et al.

(10) Patent No.: US 11,414,992 B2
(45) Date of Patent: Aug. 16, 2022

(54) MECHANISM FOR TRANSFORMING RECIPROCAL TO ROTATIONAL MOTION OR VICE VERSA, AND MECHANISM APPLICATIONS

(71) Applicant: G-drill PC, Pireaus (GR)

(72) Inventors: Georgios Georgitzikis, Heraklion Attica (GR); Vasileios Georgitzikis, Heraklion Attica (GR)

(73) Assignee: G-drill PC, Pireaus (GR)

( * ) Notice: Subject to any disclaimer, the term of this patent is extended or adjusted under 35 U.S.C. 154(b) by 0 days.

(21) Appl. No.: 17/502,880

(22) Filed: Oct. 15, 2021

(65) Prior Publication Data

US 2022/0106881 A1 Apr. 7, 2022

Related U.S. Application Data

(63) Continuation of application No. 16/314,151, filed as application No. PCT/EP2018/060281 on Apr. 23, 2018, now Pat. No. 11,220,907.

(30) Foreign Application Priority Data

Jan. 3, 2018 (GR) .............................. 20180100001

(51) Int. Cl.
*F01B 9/06* (2006.01)
*F16H 25/12* (2006.01)

(52) U.S. Cl.
CPC ............. *F01B 9/06* (2013.01); *F16H 25/125* (2013.01)

(58) Field of Classification Search
CPC  F01B 9/06; F01B 2009/065; F01B 2009/061; F16H 25/125; F16H 15/12; F16H 25/08; F16H 23/00; F16H 23/10
See application file for complete search history.

(56) References Cited

U.S. PATENT DOCUMENTS 2,401,466 A   6/1946 Davis et al.
4,854,837 A   8/1989 Cordray
(Continued)

FOREIGN PATENT DOCUMENTS

DE   2902025 B1   7/1980
EP   0320171 A1   6/1989
(Continued)

OTHER PUBLICATIONS

U.S. Appl. No. 16/314,151, Georgitziki et al., filed Dec. 28, 2018 (Year: 2018)—Parent Case, now U.S. Pat. No. 11,220,907.*

(Continued)

*Primary Examiner* — Jacob M Amick

(74) *Attorney, Agent, or Firm* — Goodwin Procter LLP

(57) ABSTRACT

Mechanism for transforming rotating to reciprocating motion, or vice versa, comprising a first annular component (1) and a second annular component (3) coaxially located, the first beside the second, along a longitudinal axis (ΔA), wherein both are able to rotate around the longitudinal axis and to reciprocate along the longitudinal axis, wherein aide (A) of the first annular component (1) adjacent to the second annular component (3) is in continuous contact, in at least one point, with the neighbouring side (Γα) of the second annular component (3), such that the second annular component (3) is able to rotate relative to the first annular component (1) in continuous contact in at least one point with the adjacent side (A) of the first annular component (1), wherein the contacting sides are undulated surfaces (A, Γα), such that if the first annular component (1) and the second annular component (3) are forced into rotational motion (Continued)

relative to each other, remaining the same time in continuous contact, then every point of the undulated surfaces (A, Γα) will trace, relative to the other, an undulated trajectory and at the same will also execute, relative to the other, reciprocating motion.

48 Claims, 20 Drawing Sheets

(56) References Cited

U.S. PATENT DOCUMENTS

| | | | |
|---|---|---|---|
| 5,036,809 | A | 8/1991 | Goodman |
| 7,299,740 | B2 | 11/2007 | Adams |
| 7,438,027 | B1 | 10/2008 | Hinderks |
| 10,115,545 | B2 | 10/2018 | Andaluz Sorli |
| 11,220,907 | B2 * | 1/2022 | Georgitzikis ......... F16H 25/125 |
| 2005/0155443 | A1 | 7/2005 | Krozek |
| 2015/0020680 | A1 | 1/2015 | Liao |

FOREIGN PATENT DOCUMENTS

| | | |
|---|---|---|
| EP | 0432786 A1 | 6/1991 |
| EP | 1635059 A2 | 3/2006 |
| EP | 2826954 A1 | 1/2015 |
| EP | 3018672 A1 | 5/2016 |
| FR | 370319 A | 2/1907 |
| GB | 27071 | 2/1914 |
| GB | 304701 A | 4/1930 |
| JP | 58206801 | 12/1983 |
| RU | 2047024 C1 | 10/1995 |

OTHER PUBLICATIONS

Greek Search Report issued in corresponding Greek Patent Application No. 20180100001 dated Jan. 14, 2019.
International Search Report issued in corresponding International Patent Application No. PCT/EP2018/060281 dated Sep. 10, 2018.
Written Opinion issued in corresponding International Patent Application No. PCT/EP2018/060281, dated Sep. 10, 2018.

* cited by examiner

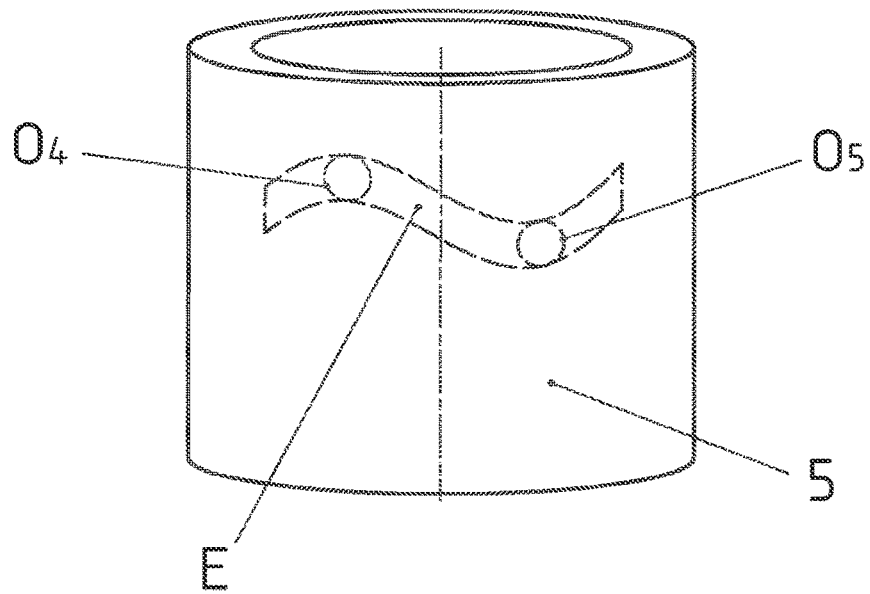
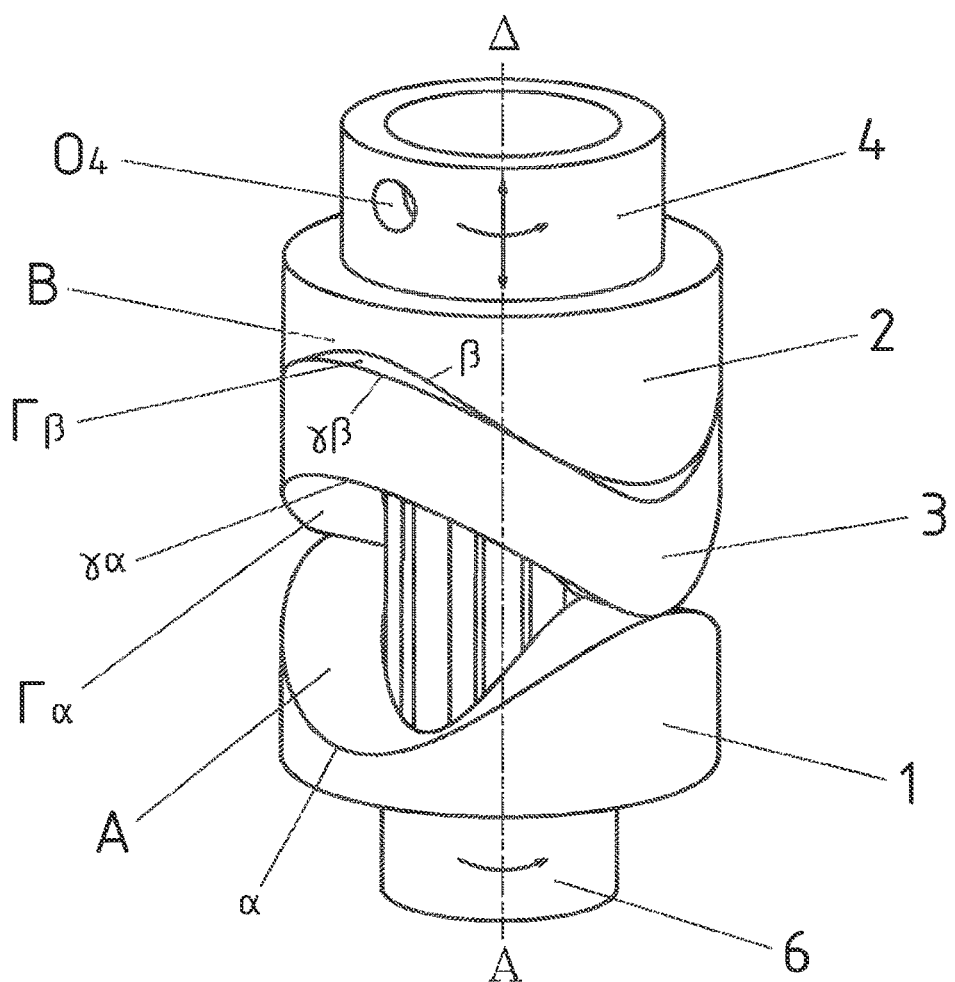
Fig. 2

Figure 15.a
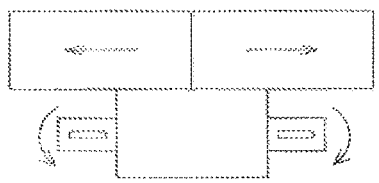
Figure 15.b
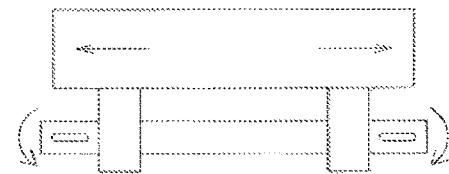
Figure 15.c
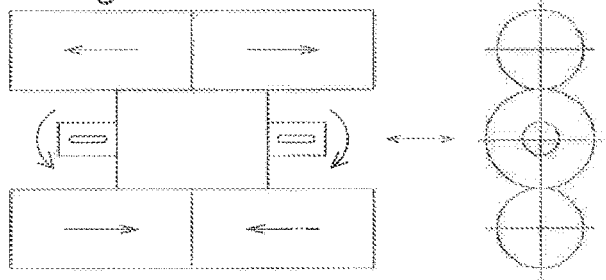
Figure 15.d
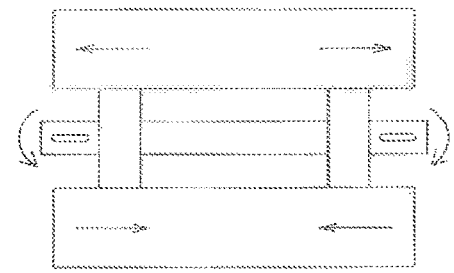
Figure 15.e
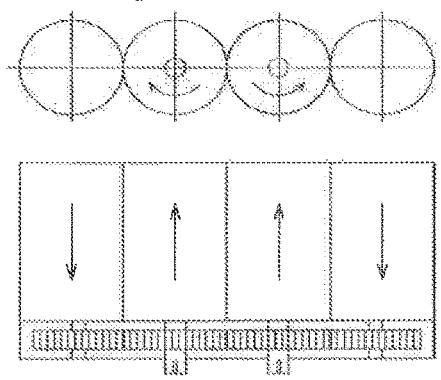
Figure 15.f
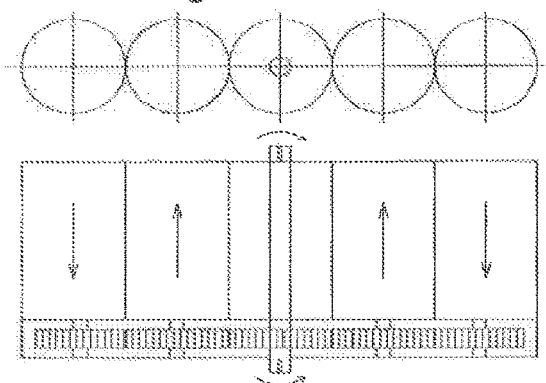
Figure 15.g
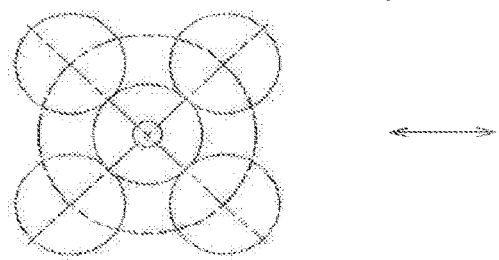
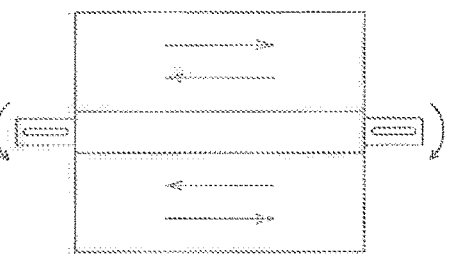
Figure 15.h
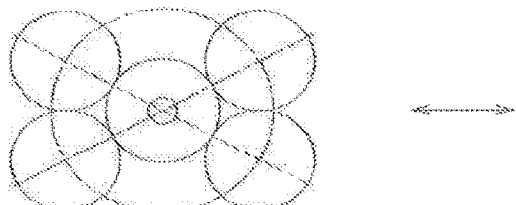
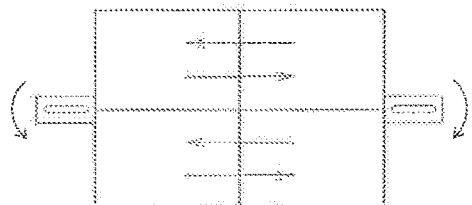

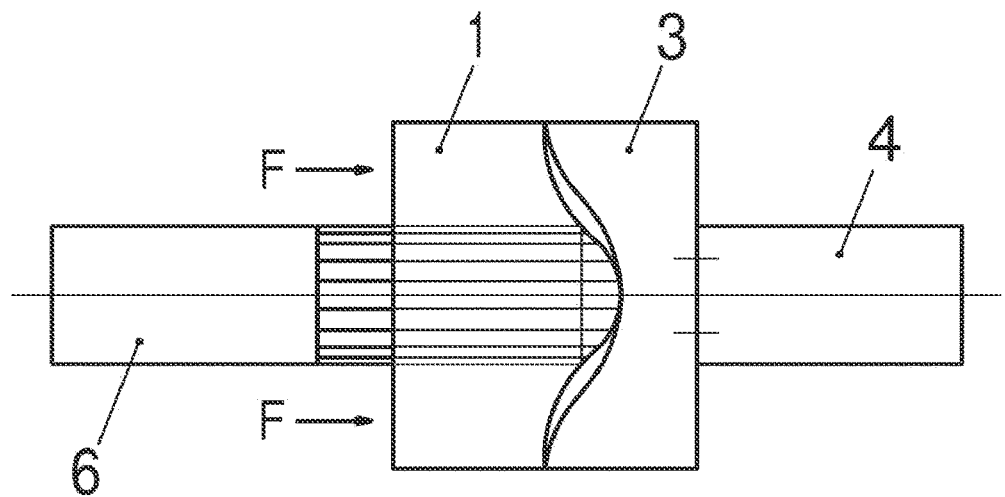
Figure 16.a
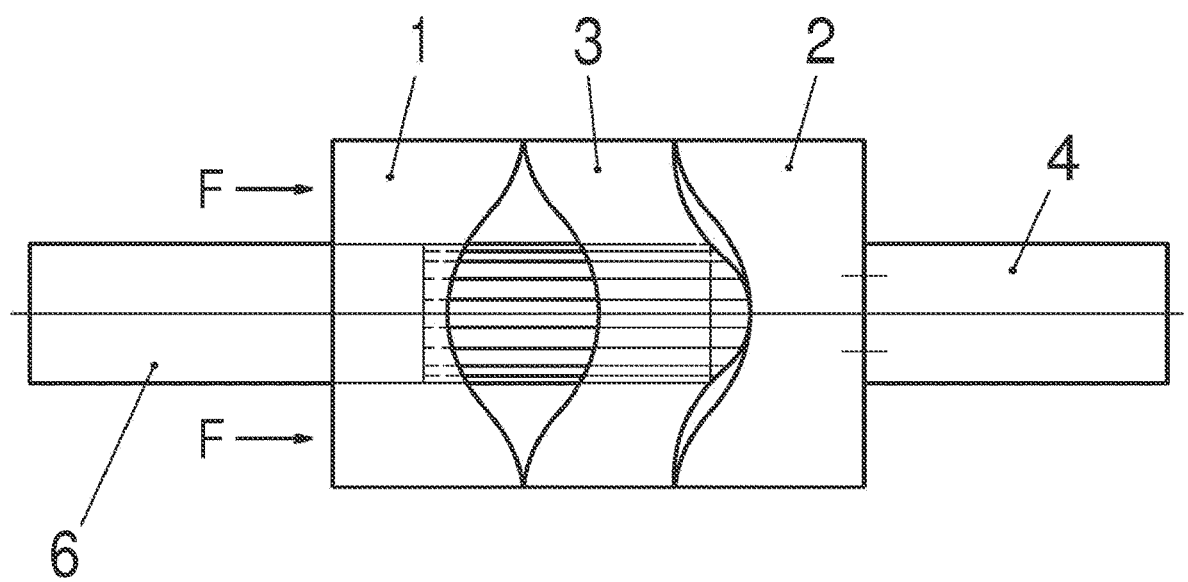
Figure 16.b

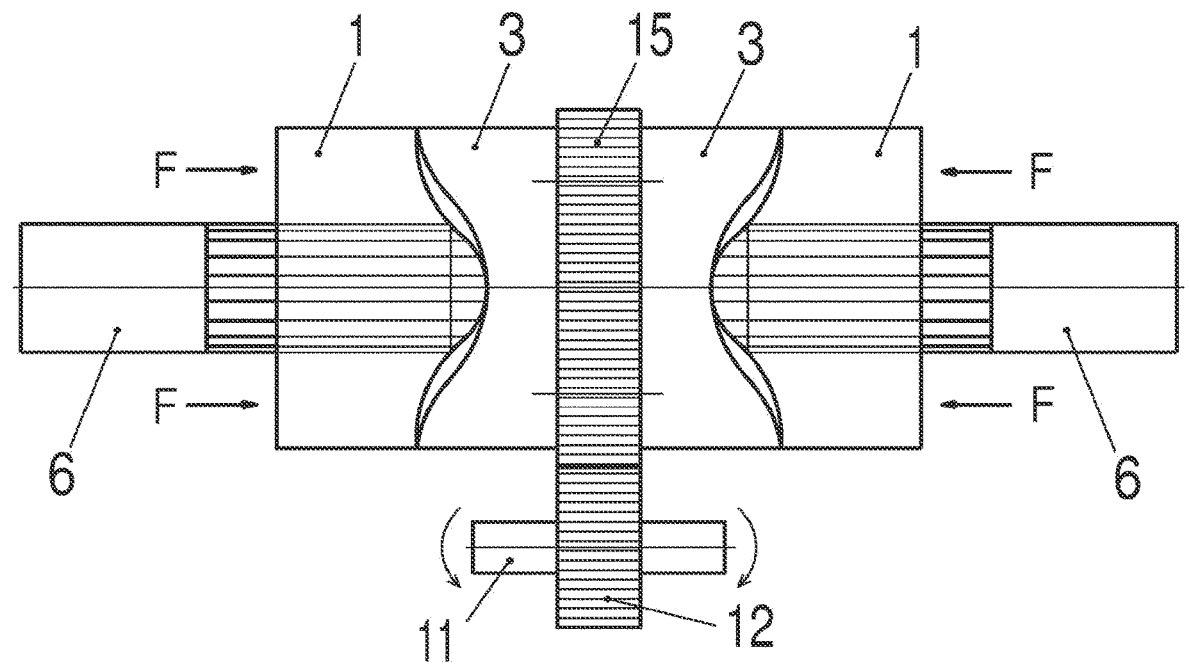
Figure 17.a
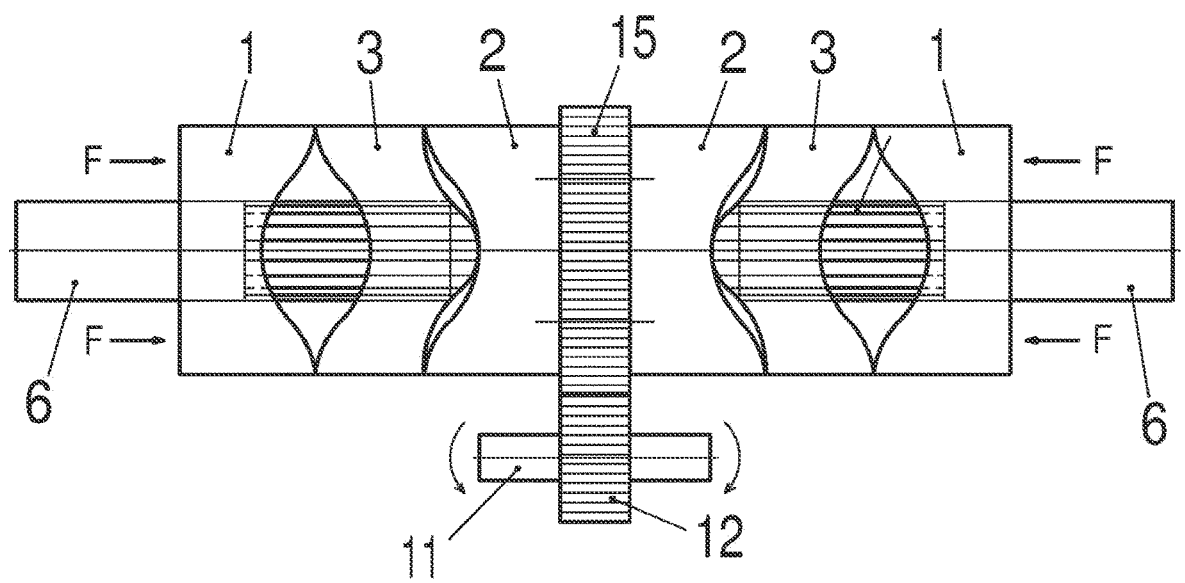
Figure 17.b

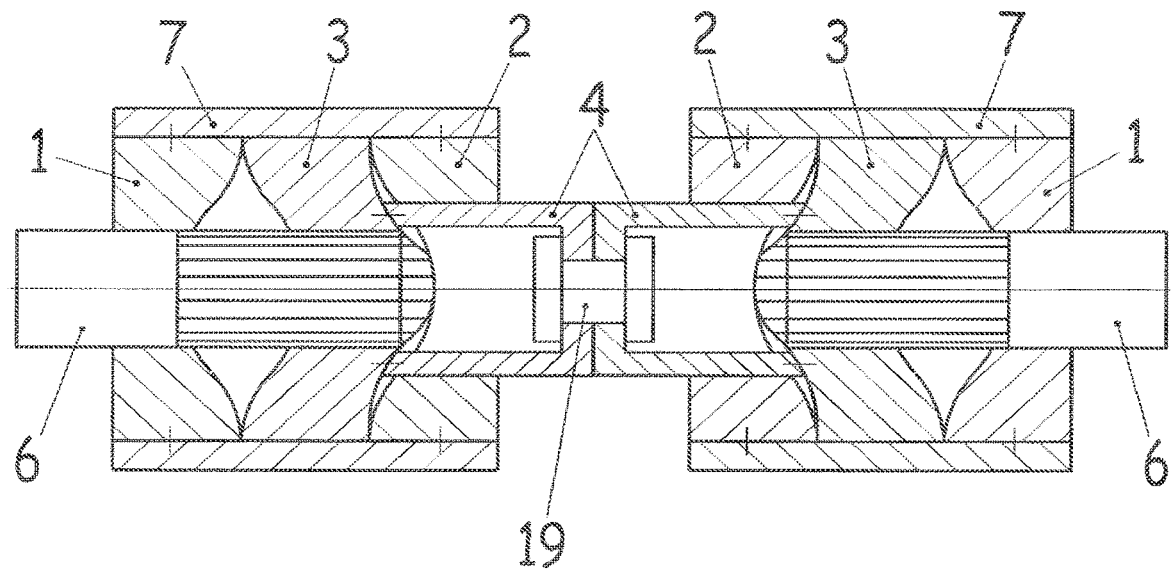
Figure 18.a
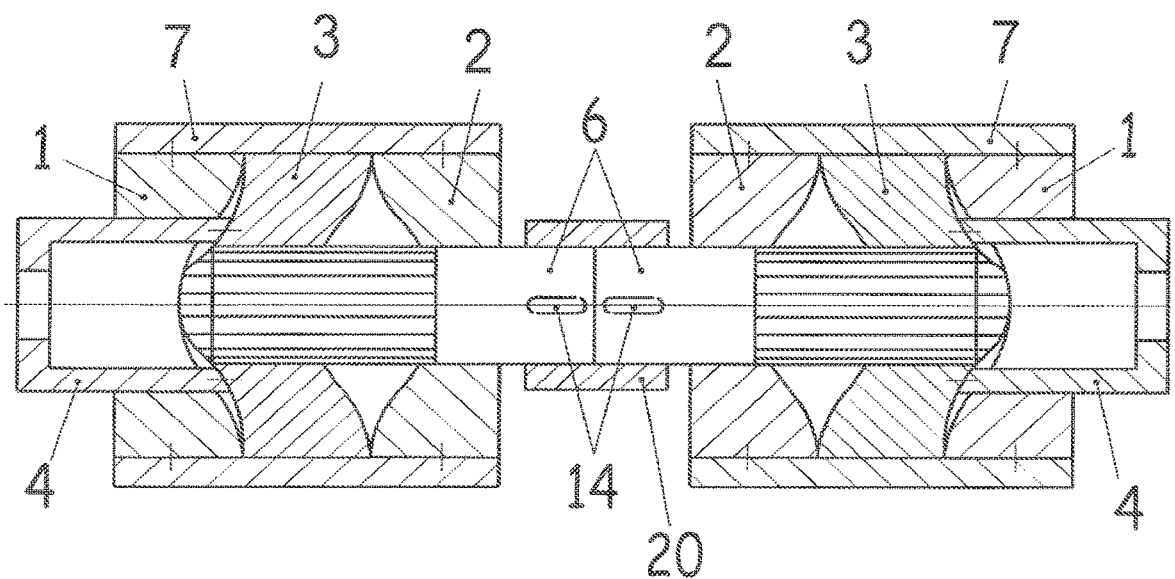
Figure 18.b

MECHANISM FOR TRANSFORMING RECIPROCAL TO ROTATIONAL MOTION OR VICE VERSA, AND MECHANISM APPLICATIONS

The invention relates to a mechanism for transforming reciprocal to rotational motion or vice versa according to claim 1. It relates also to applications for the mechanism, as in fluid flow control valves, in piston engines, such as motors or pumps/compressors, in automation systems as well as in clutches, differentials, rotation/reciprocation speed increasing-reducing device and electromechanical couples in power generators/electric motors.

The most known and widespread straight-line reciprocal to rotational motion transformation mechanism is the piston—piston rod—crank mechanism. It finds widespread application in piston engines (motors or pumps/compressors) operating usually with air, water (liquid or steam), oil and fuels in a liquid or gaseous state (e.g. hydrocarbons, hydrogen etc.). The flow control of each working fluid is achieved by valves of various types, opening and closing using many different ways or mechanisms (e.g. gravity, springs, rods, camshafts etc.).

A serious disadvantage of the piston—piston rod—crank mechanism, as well as the engines based thereon, is the complexity and the large number of moving parts. The same applies also to the kinematic properties relating to the position, speed and acceleration of the moving parts as well as the vibrations caused by the inertial forces being developed. This is why balancing the mechanism is imperative; however balancing does not completely solve the problem due to the higher order harmonics remaining. Moreover, in the ICEs (Internal Combustion Engines), a disadvantage of the mechanism comprises also the piston inability to rest at the Top Dead Centre (TDC) and the Bottom Dead Centre (BDC) for a certain time interval, in order for the combustion to improve and the efficiency to increase, as well as to allow adequate time for cylinder exhaust gases sweeping/flushing out to take place in the two-stroke engines, respectively.

The present invention concerns a simple mechanism for transforming rectilinear reciprocating motion to rotational, or vice versa, without a crankshaft and piston rod, being also able to provide the possibility of delaying the inversion of motion at the extreme positions of reciprocation (TDC and BDC). At the same time, it allows the provision of a valve configuration with simple apertures for fluid flow control. It also concerns products that can incorporate said mechanism and/or valve configuration with simple apertures, such as e.g. piston engines (motors or pumps/compressors), clutches, differentials, rotation/reciprocation speed increasing-reducing device, electromechanical couples in power generators/electric motors and automations.

According to the invention a mechanism for transforming reciprocal to rotational motion is proposed, or vice versa, including a first annular component and a second annular component coaxially mounted the first one adjacent the second along a longitudinal axis, wherein both of them are capable of rotating round the longitudinal axis and reciprocating along the longitudinal axis, wherein the side of the first annular component adjacent the second annular component is in continuous contact, in at least one point, with the neighbouring side of the second annular component, wherein the contacting sides are smooth undulated surfaces formed as a geometric locus of the radii passing through smooth undulated curves of the external cylindrical surface of the first and second annular components, starting from their external surface and terminating in their internal surface, being characterized by n (natural number 0) repeated pairs of crests and valleys, wherein said crests/valleys are symmetric relative to the level defined by the highest/lowest point of the crest/valley (respectively) and the longitudinal axis.

According to the invention the crests of the undulated surface of the first annular component may be in contact with the crests of the undulated surface of the second annular component and in this position the points of contact are located on a plane perpendicular to the longitudinal axis, relative to which the undulated surfaces of the first annular component and the second annular component are symmetrical.

In addition the crests of each and every undulated surface are smaller than the geometrically similar valleys with a similarity ratio of 1:3, such that, when the crests enter the valleys of the other, and crest edges come into contact with the lowest point of the valleys of the opposite undulated surface, there is free space left between the undulated surfaces, resulting, when lubricated, in achieving friction and wear minimization owing to dynamic lubrication.

With the proposed mechanism if the first annular component and the second annular component are forced into rotational motion relative to each other, remaining at the same time in continuous contact, then each point of the contacting undulated surfaces will trace, in relation to the other, an undulated trajectory and will execute at the same time, in relation to the other, a reciprocating motion n-times the frequency, wherein n is the number of crests/valleys, of the corresponding rotational motion frequency, between a TDC (Top Dead Centre) and a BDC (Bottom Dead Centre), this relative motion being executed by each component connected firmly to one of the annular components, while each component, e.g. a piston, connected to one of the annular components, in such a way that this connected component is free not to follow the rotation of the component to which it is connected, executes reciprocating motion only relative to the other annular component so that rotational motion is transformed to reciprocating motion of the component with or without coexisting rotation, whereas, conversely, the forced reciprocating motion of one annular component relative to the other is transformed to rotational motion of the component with or without the coexistence of reciprocating motion.

The edges of the crests and valleys of the undulated surfaces of the two annular components may be points or straight sections perpendicular to the longitudinal axis, wherein if the edges of the crests and valleys are points, in case of relative rotational motion between the two annular components at constant speed, a generally simple and in special cases harmonic reciprocation results, whereas if the edges of the crests and valleys are straight sections, in the case of relative rotational motion between the two annular components at constant speed, a reciprocation results with a delay in the reversal of motion in the TDC and BDC proportional to the length of the straight sections. The reciprocating motion will be harmonic in case the planar spread of these curves comprises sinusoidal curves without straight sections in the crests perpendicular to the longitudinal axis.

Note 1: In the previous paragraph, but also in the subsequent description as well as in the claims, whenever—for simplicity and brevity reasons in expression—reference is made to "points or straight sections" of the crest and valley edges and to "curves" of the frontal undulated surfaces of the annular components, in reality, this reference implies the planar spread of the undulated curves of the external surfaces of the first, second and, whenever provided, third annular component from which initiate the radii forming the adjacent (neighbouring) undulated surfaces of the annular components.

Note 2: In the description as well as in the claims, whenever reference is made to contact "in at least one point" between the first and second or second and third annular components 1 and 2 or 2 and 3, respectively, this point is meant to denote position. Actually contact is taking place in the straight sections of the radii forming the undulated surfaces of the annular components 1, 2 and 3, which under load, convert to narrow strips: practically to narrow trapezia.

The second annular component may function as a rotor and the first as a stator or vice versa. In the present description, applications are presented wherein the second annular component functions as a rotor and the first as stator.

An additional mechanism is provided, in many applications, forcing the second annular component to be pushed on to the first annular component, such that the contacting undulated surfaces are in continuous contact relative to each other.

FIGS. 1-20 show the operating principle of the mechanism and its applications. These drawings do not follow precisely the principles of mechanical engineering drawing. These illustrations have not been drawn in great detail, and comprise simplifications, the major ones being the following:

a. FIGS. 5 to 13 do not show views, only half-elevations: the arrangement with the rotor and piston position in TDC appears on the right and on the left the same in BDC.
b. Certain components known to the skilled artisan in the field are shown as a single integral part, however, in reality they are complexes of more than one component.
c. Usual engine parts, known to the skilled artisan in the field (e.g. screws, ball-bearings, bushings, gaskets, flanges etc.) are not shown.
d. Small axial lines indicate that the neighbouring components are firmly connected together.

FIGS. 1, 2, 3 and 4 show in a simplified way the operating principle upon which the present invention is based, whereas in FIG. 2 (above) a simple array of valves is shown in a simplified way, controlling the fluid flow, according to the present invention.

FIG. 15 shows multi-cylinder arrangements based on FIGS. 5 to 14, wherein absolute neutralisation is achieved of the inertial forces resulting from the reciprocating masses of the rotor and the piston.

FIG. 16a shows a first arrangement of a clutch based on the motion transformation mechanism according to the invention.

FIG. 16b shows a second arrangement of a clutch based on the motion transformation mechanism according to the invention.

FIG. 17a shows a first arrangement of a differential based on the motion transformation mechanism according to the invention.

FIG. 17b shows a second arrangement of a differential based on the motion transformation mechanism according to the invention.

FIG. 18a shows a first arrangement of a rotation/reciprocation speed increasing-reducing device based on the motion transformation mechanism according to the invention.

FIG. 18b shows a second arrangement of a rotation/reciprocation speed increasing-reducing device based on the motion transformation mechanism according to the invention.

Figure 20:
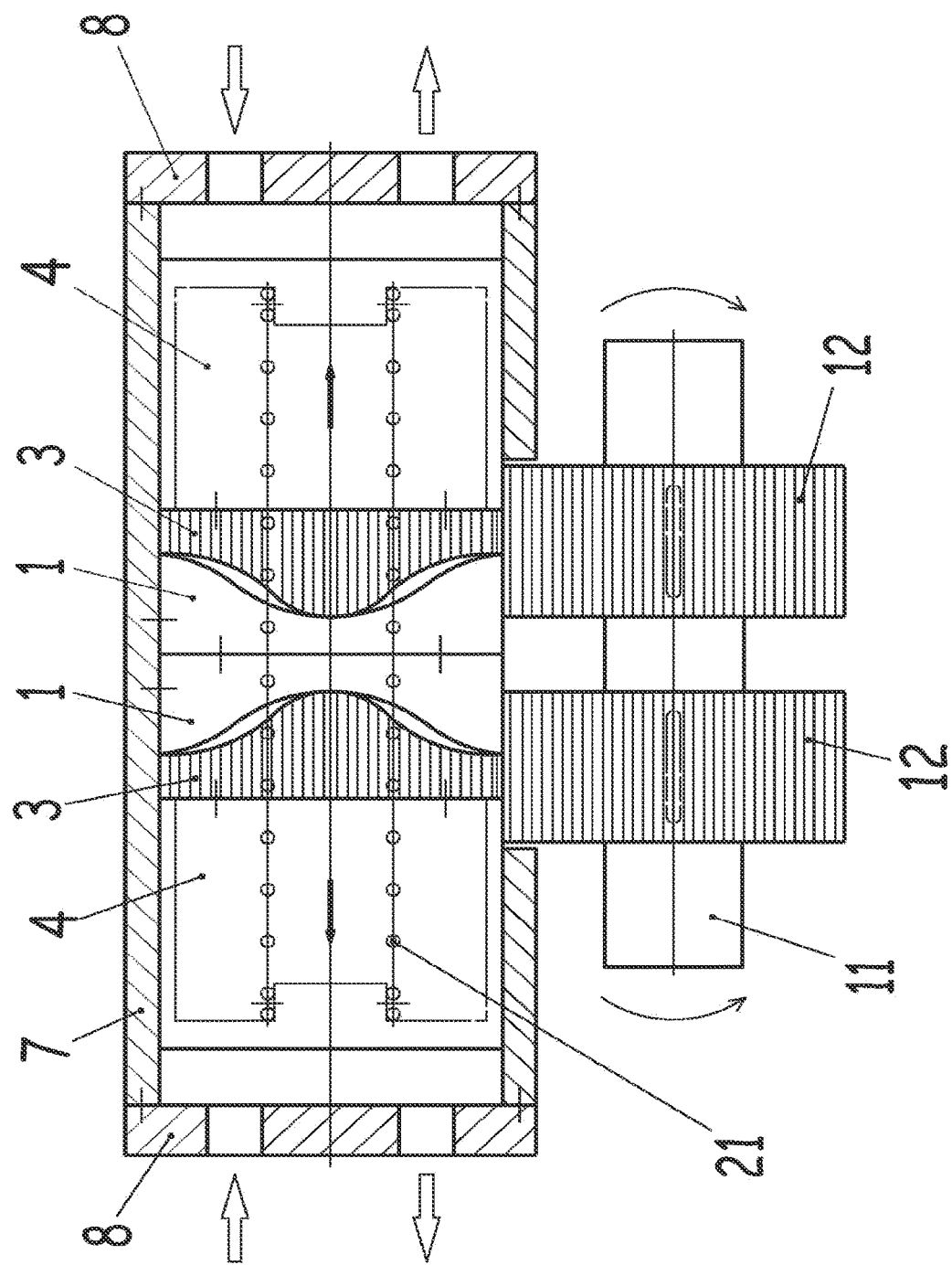

FIG. 20 presents engines based on the motion transformation mechanism according to the invention, with two mirror-image symmetric cylinders, a pair of undulated surfaces per cylinder plus a mechanism forcing them into contact using pressure and the assistance of a spring.

Figure 1:
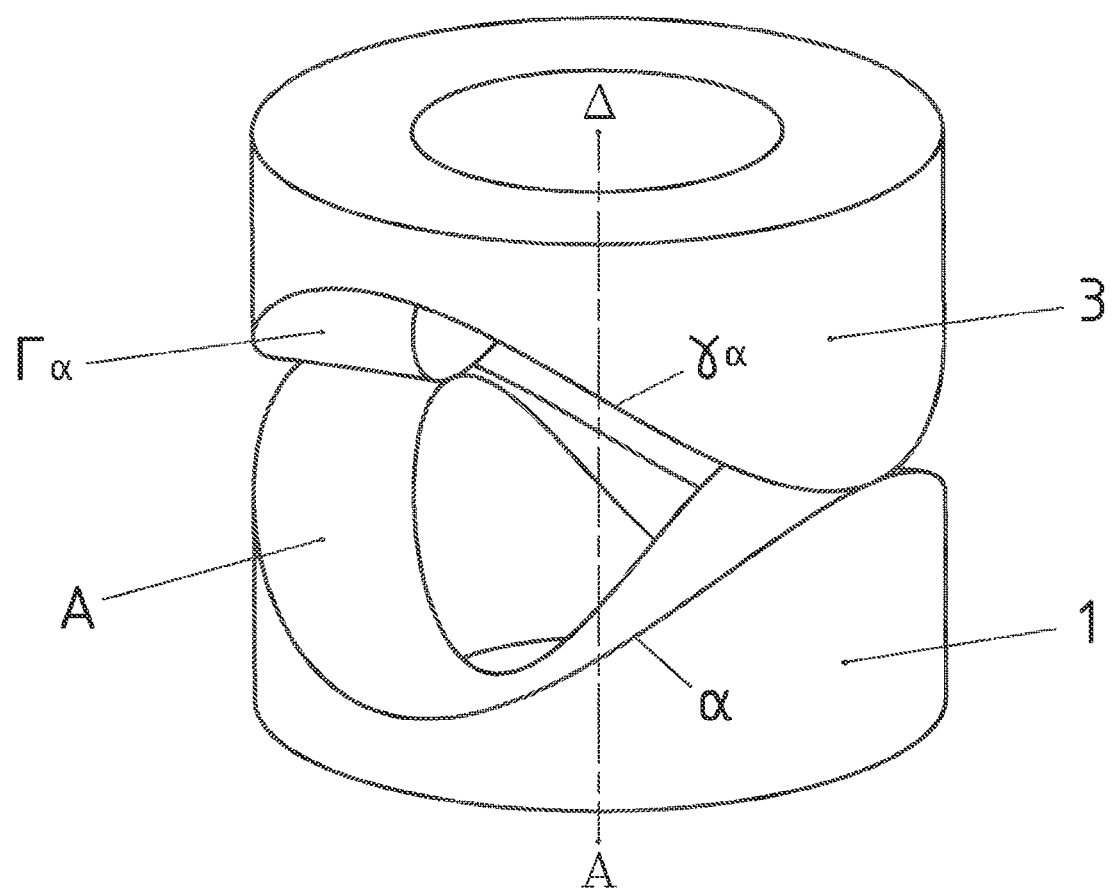

In FIG. 1 the motion transformation mechanism is shown, according to the invention, comprising a first annular component 1 and a second annular component 3 coaxially located, the first beside the second, along a longitudinal axis $\Delta A$, the two components being able to rotate around the longitudinal axis $\Delta A$ and to reciprocate along the longitudinal axis $\Delta A$. Side A of the first annular component 1 adjacent the second annular component 3 is in continuous contact in at least one point with neighbouring side Ta of the second annular component 3, such that the second annular component 3 can move relative to the first annular component 1 being in continuous contact in at least one point with neighbouring side A of the first annular element 1. The contacting sides are smooth undulated surfaces A, $\Gamma_\alpha$, shaped as a geometric locus of the radii passing through the undulated curves a and $\gamma_\alpha$, respectively, of the external cylindrical surface of the first and second annular component 1, 3, starting off from their external surface and terminating in their internal surface and being characterized by n (natural number #0) repeated pairs of geometrically similar crests and valleys with a similarity ratio 1:3, wherein the crests/valleys are symmetric as regards the level defined by the upper/lower point of the crest/valley (respectively) and the longitudinal axis ΔA. In FIG. 1 to 4, n=2.

If the first annular component 1 and the second annular component 3 are forced into rotational motion relative to each other, remaining at the same time in continuous contact, then each point of the undulated surfaces A, $\Gamma_\alpha$ will trace, in relation to the other, an undulated trajectory and will execute at the same time a reciprocating motion with a frequency n-times, wherein n is the number of crests/valleys, the corresponding rotational motion frequency, between a TDC (Top Dead Centre) and a BDC (Bottom Dead Centre), this relative motion being executed by each component connected firmly to one of the annular components 1 or 3, on the other hand each component connected to one of the annular components 1 or 3, such that this connected component is free not to follow the rotation of the component to which it is connected, executes reciprocating motion only, relative to the other annular component, so that rotational motion is transformed to reciprocating motion of the component with or without coexisting rotation, whereas, conversely the forced relative reciprocating motion of one annular component 1 or 3 relative to the other is transformed to rotational motion of the component with or without the coexistence of reciprocating motion.

According to FIG. 1, the crests of each and every undulated surface A, $\Gamma_\alpha$ are smaller than the geometrically similar valleys with a similarity ratio of 1:3, such that, when they enter the valleys of the other, and points of the crests come into contact with points of the opposite undulated surface, there is free space left between the undulated surfaces, resulting, when lubricated, in achieving friction and wear minimization owing to dynamic lubrication.

In FIG. 2 a motion transformation mechanism is shown, according to the invention, differing from the mechanism of FIG. 1 in that it comprises an additional mechanism forcing the second annular component 3 to be pushed onto the first annular component 1, in order for the undulated surface $\Gamma_\alpha$ to be in continuous contact with undulated surface A. The additional mechanism comprises a third annular component 2, coaxially mounted in relation to the first and the second annular components 1, 3 such that the second annular component 3 is located between the first and the third annular component 1, 2, the adjacent side thereof, being the one towards the second annular component 3, is undulated surface B characterized by the same undulated curve A of the first annular component 1, and by being its mirror-image in space and in continuous contact in at least one point with its adjacent side of the second annular component 3, which is also undulated surface $\Gamma_\beta$ characterized by having the same undulated curve-shape with the first annular component 1 of the adjacent side $\Gamma_\alpha$ of the second annular component 3, but located symmetric to surface $\Gamma_\alpha$ and displaced distally with the crests located opposite the valleys of surface $\delta_\alpha$, such that the second annular component 3 may rotate relative to the first and third annular components 1,2 and in continuous contact in at least one point with one side of the first and with one side of the third annular component 1,2.

In the example of FIG. 2 the second annular component 3 is connected to a piston 4 either firmly, or in such a way that the second annular component 3 and the piston 4 are free to rotate independently around the longitudinal axis ΔA. Furthermore, a cylindrical liner 5 is shown (dismantled in the extension of longitudinal axis ΔA), inside which moves—in circumferential contact—cylindrical piston 4 covered by a cover 8. In this example the second annular component 3 functions as a rotor, whereas first and third annular components 1,2 function as stators.

If piston 4 is concave and connected firmly to the second annular component 3, and at least one aperture $O_4$ is located on piston surface 4, in case of rotational motion of the second annular component 3, aperture $O_4$, tracing a wavy trajectory E, will meet at least one aperture $O_5$ of fixed liner 5 found inside, or crosses trajectory E. The common points of apertures $O_4$ and $O_5$ allow for periodic communication between the interior of piston 4 and the exterior of liner 5, for the time duration the apertures of piston 4 and liner 5 are communicating. Thus, a very simple arrangement of fluid flow control valves is created, between the internal space and the external environment, in a cylinder of a piston engine, through concave piston 4 and liner 5.

Figure 3:
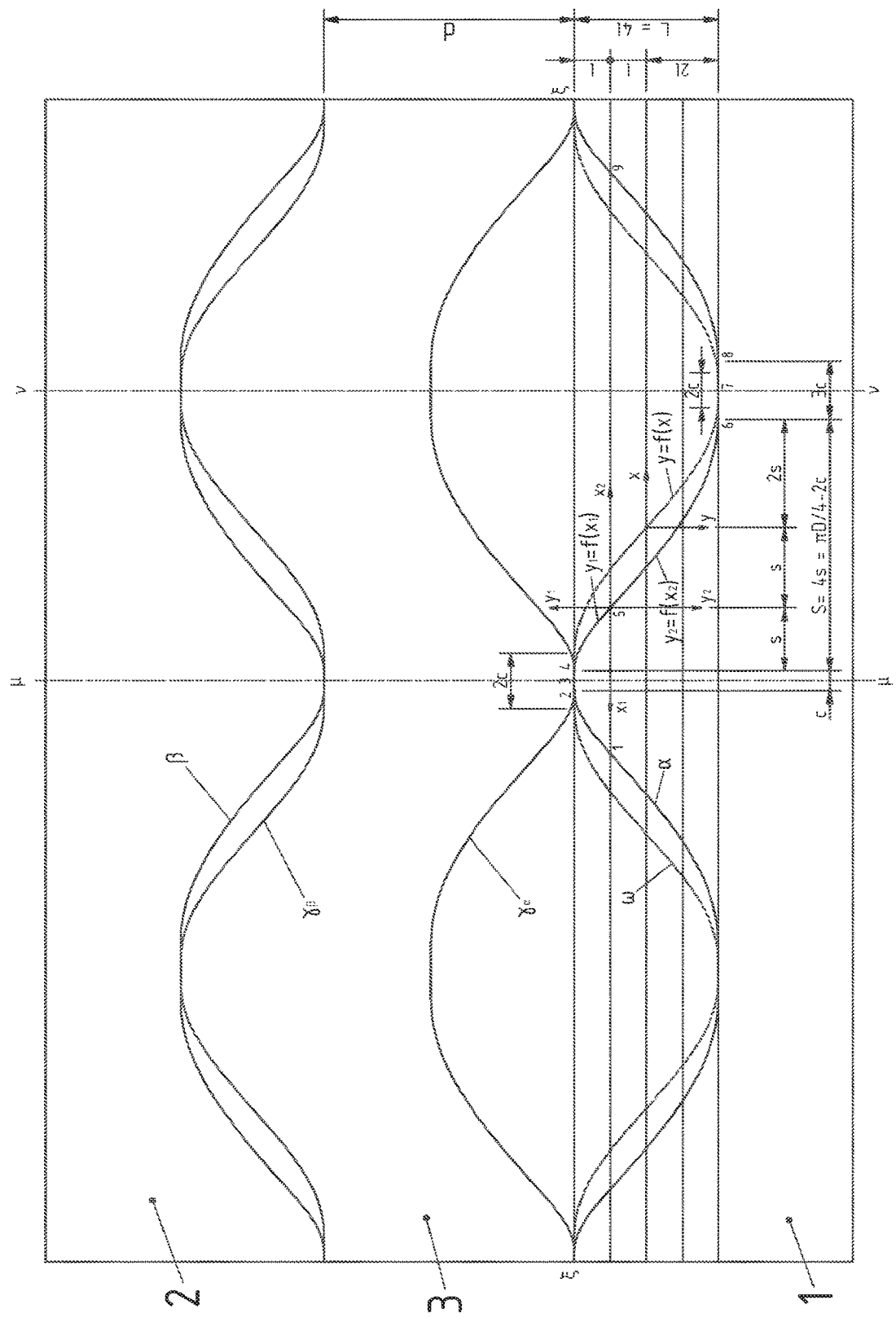

In FIG. 3 spreads are shown of the undulated curves α, $\gamma_\alpha/\gamma_\beta$ and β, respectively, of the external cylindrical surfaces of the first, second and third annular components 1, 3 and 2 of FIG. 2.

From FIG. 3 emerges that the crests of the undulated surface of the first annular component 1 may be in contact with the crests of the undulated surface of the second annular component 3 and that in this location the undulated surfaces A, $\Gamma_\alpha$ of the first annular component 1 and the second annular component 3 are both in symmetry to a plane connecting together their points of contact, whereas in this location the crests of the undulated surface B of the third annular component 2 are in contact with the valleys of the opposite undulated surface $\Gamma_\beta$ of the second annular component 3 and the crests of the undulated surface of the second annular component 3 are in contact with the valleys of the opposite undulated surface of the third annular component 2.

From FIG. 3 it emerges that provided rotor 3 is rotated, each point of rotor 3 and piston 4, which is firmly connected to the rotor, will be moved tracing a closed undulated trajectory, with a spread similar to curve ω, (with equal crests and valleys that are geometrically similar to the crests and valleys of the undulated curves α, $\gamma_\alpha/\gamma_\beta$ and β with similarity ratios 2:1 and 2:3, respectively), traced by point 3 of each crest of curve $\gamma_\alpha$ of rotor 3. This motion, in case rotor 3 rotates with a constant velocity, is analyzed in a smooth circular motion with the same frequency and a reciprocal motion between TDC (Top Dead Centre) and BDC (Bottom Dead Centre) with double (generally n-times) frequency.

According to the invention, the edges of the crests and valleys are points or straight sections perpendicular to the longitudinal axis as depicted in FIG. 3, wherein if the edges of the crests and valleys are points, in the case of relative rotational motion of rotor 3 between two annular components 1,3 with constant velocity, results a simple and/or harmonic reciprocation, whereas if the edges of the crests and valleys are straight sections, in the case of relative rotational motion of rotor 3 between two annular components 1,3 with constant velocity, results a reciprocal motion with an inversion delay in TDC and BDC.

Figure 4:
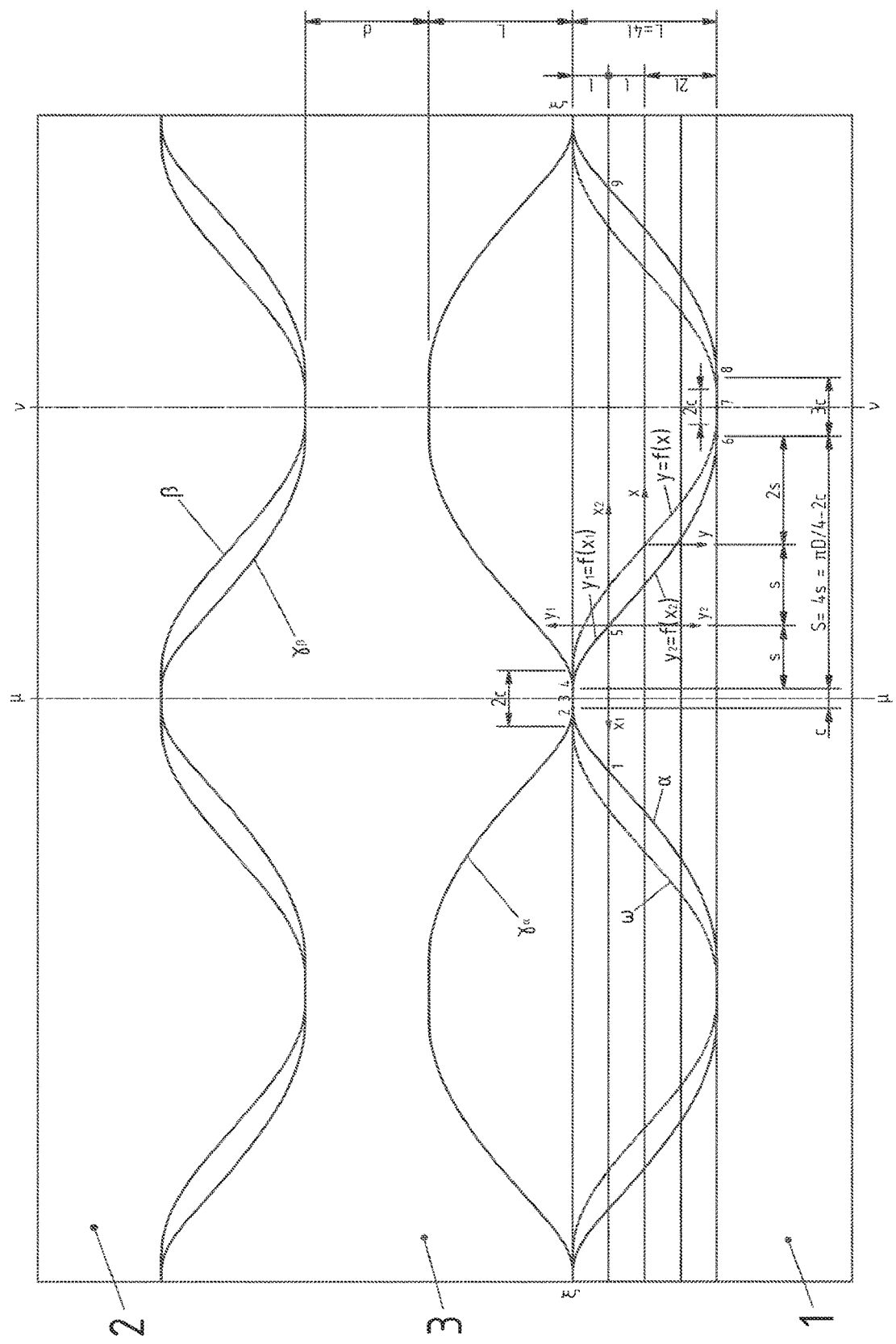

In FIG. 4 spreads are shown of the undulated curves α, $\gamma_\alpha/\gamma_\beta$ and β, respectively, of the external cylindrical surfaces of the first, second and third annular components 1, 3 and 2 of FIG. 2, the only difference being that the third annular component 3 is symmetrical to the plane perpendicular to the longitudinal axis AA. In relation to FIG. 3, curves α and $\gamma_\alpha$ are the same and in the same relative and absolute location as those of FIG. 3, on the other hand curves $\gamma_\beta$ and β are the same and in the same relative location as those of FIG. 3, however, in a different position in relation to curves α and $\gamma_\alpha$, resulting in the crests and valleys of the second annular element 3 being symmetric and located opposite crests and valleys, respectively. Also in this particular case, the second annular component 3 may be rotating relative to the first and third annular component 1, 2 continuously contacting, at least at one point, one side of the first and one side of the third annular component 1,2.

In FIGS. 3 and 4, for curves α, $\gamma_\alpha$ and, in case there is the additional mechanism comprising the third annular component 2, for curves β and $\gamma_\beta$ the following apply:

1. It is about the same smooth, periodic, undulated curve in different locations with number n (natural 0) of repeated pairs of geometrically similar crests 12345 and valleys 56789 with a similarity ratio of 1:3 (in FIGS. 1, 2, 3 and 4: n=2).
2. Curve $\gamma_\alpha$ is symmetric to a relative to axis ξ-ξ In FIG. 3 curve β results by the axial displacement (by d) of $\gamma_\alpha$, while $\gamma_\beta$ by axial (L+d) and circumferential displacement by 90□ (generally 360□/2n) of a. In FIG. 4 curve β results by the axial (L+d) and circumferential displacement by 90□ (generally 360□/2n) of $\gamma_\alpha$, while $\gamma_\beta$ by axial displacement (2L+d) of α.
3. Each crest 12345 is symmetrical relative to axis μ-μ and each valley 56789 relative to axis v-v. The crests and valleys are expressed in the systems of coordinates $x_1$-$y_1$ and $x_2$-$y_2$, with common origin, point 5, and opposite axes, from the similar equations $y_1=f(x_1)$ and $y_2=f(x_2)$, respectively. The crests occupy 1/4 and the valleys the remainder 3/4 of the total height L of the undulated curves α, β, $\gamma_\alpha$ and $\gamma_\beta$.
4. Sections 234 and 678 may be straight, wherein: 678≥234≥0
5. When crests of one curve enter the valleys of the other, leave free space between their curves, i.e. the size of the crests is smaller than that of the geometric similar valleys with a similarity ratio of 1:3.
6. If the external surface of rotor 3 moves to one direction, while those of the stators 2 and 3 remain motionless, it is proved that curves $\gamma_\alpha$ and $\gamma_\beta$ will remain in continuous contact with curves α and β, respectively, whereupon for point 3 (centre of crest) of curve $\gamma_\alpha$, as well as for every point of the spread of the external surface of rotor 3, it is proved that it will move tracing an undulated trajectory like ω, (with equal crests and valleys that are geometrically similar to the crests and valleys of the undulated curves a, $\gamma_\alpha$/$\gamma_\beta$ and β with similarity ratios 2:1 and 2:3, respectively), with or without straight sections in its crests and valleys (FIG. 3 or 4), as described below in section 9. Curve ω is expressed in the system of coordinates x-y, the point in the middle of height L being the origin and in equal distance from axes μ-μ and v-v, from equation y=f(x) which is similar to equations $y_1=f(x_1)$ and $y_2=f(x_2)$. The total height of curve co is equal to the total height L of the undulated curves α, β, $\gamma_\alpha$ and $\gamma_\beta$.
7. Referring to FIGS. 3 and 4, two characteristic pairs of equations are mentioned as an example, describing parts 45 and 56 of curve a respectively:

a. $y_1 = l \cdot \sin\frac{x_2}{z}$ and $y_Z = 3l \cdot \sin\frac{x_2}{3s}$, (sinusodial), wherein:

$$0 \le \frac{x_1}{x} \le \frac{\pi}{2}$$

with 234=c≥0 and $$0 \le \frac{x_2}{3z} \le \frac{\pi}{2}$$

with 678=3c.

b.

$$y_1 = l \cdot \left(\frac{x_2}{s}\right)^2$$

and $$y_2 = 3l \cdot \left(\frac{x_2}{3s}\right)^2$$

(polyonymic), wherein:

$$0 \le \frac{N_1}{s} \le 1$$

with 234=c≥0 and $$0 \le \frac{x_2}{3s} \le 1$$

with 678=3c.

The coordinates are referring to suitably selected axes of coordinates for each equation, as mentioned above in section 3.

8. In the case of the curves of previous section, trajectory co traced by each point of the spread of external surface of rotor 3 will be derived, respectively, from equations:

a.

$$y = 2l \cdot \sin\frac{x}{2s},$$

wherein:

$$-\frac{\pi}{2} \le \frac{x}{2s} \le \frac{\pi}{2}$$

(sinusoidal).

b.

$$y = 2l \cdot \left(\frac{x}{2s}\right)^2$$

twice, wherein:

$$0 \le \frac{x}{2s} \le 1$$

(polyonymic).

The coordinates are referring to suitably selected axes of coordinates for each equation, as mentioned above in section 3.

9. If sections 234 and 678 are straight with a length (precisely) of c and 3c, respectively, between the curved sections of the trajectory or curvilinear motion co, described by the previous equations of passage 8, interposed equally are equal sections of length 2c, corresponding to equal time intervals of delay in motion inversion in TDC and BDC. A different relation (ratio) of the lengths of sections 234 and 678 poses problems, such as to bring about the insertion of unequal straight sections, i.e. a different motion inversion delay in TDC and BDC, possibly causing problems of timing in multi-cylinder engines. Generally, equal delay time intervals in motion inversion in TDC and BDC result in case the crest edges are straight sections of length c and the valley edges are straight sections of length 3c, respectively.

Remark: In order to achieve a—desirable—smooth periodic undulated trajectory or curvilinear motion co (of all the points of the external surface of rotor 3) with equal crests and valleys, we specify the undulated curves α, $\gamma_\alpha/\gamma_\beta$ and β, such that the crests and the valleys are similar to the crests/valleys of curve co with a similarity ratio of 1:2 and 3:2, respectively. Then, rotor 3 rotates and reciprocates smoothly, sliding—continuously contacting—simultaneously both stators 1 and 2, however, this is not true in case the crests of curve co are not equal to its valleys, because stator 3 motion is blocked.

Definition: We say that a geometric shape $\Sigma_2$ is similar to some other geometric shape $\Sigma_1$ (as regards a common coordinates system), provided that the coordinates of $\Sigma_2$ result from the corresponding coordinates of $\Sigma_1$ by multiplying them with the similarity ratio. The similarity ratio may be greater, lesser or equal to one; therefore we may get enlargement, shortening or equality to $\Sigma_1$, respectively.

Figure 5:
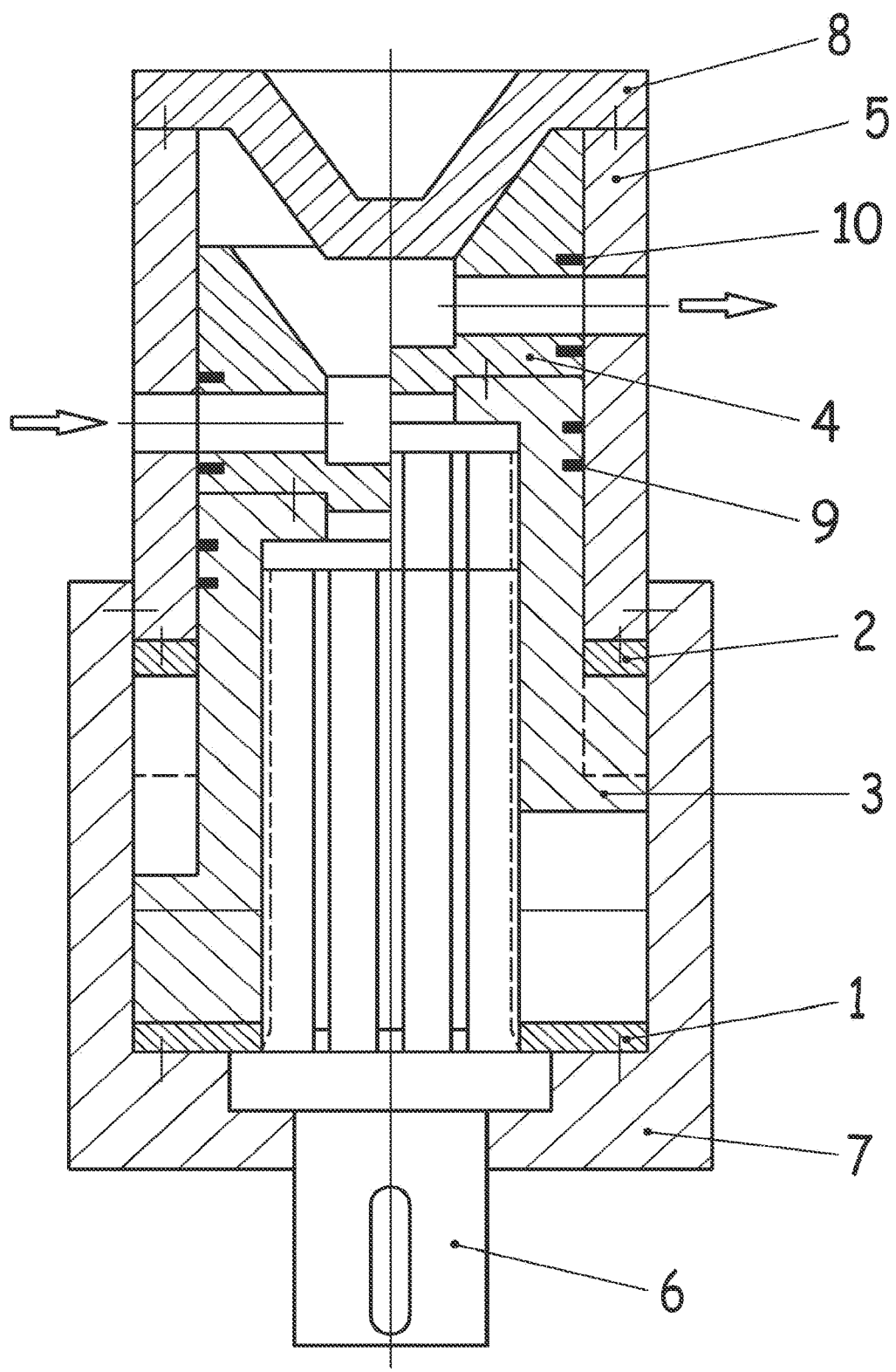
FIG. 5 shows the cylinder of a piston engine having a mechanism of transforming the motion according to the invention, valves with apertures, rotor cooperating with an axle through a spline, plus a piston reciprocating while rotating.
Figure 6:
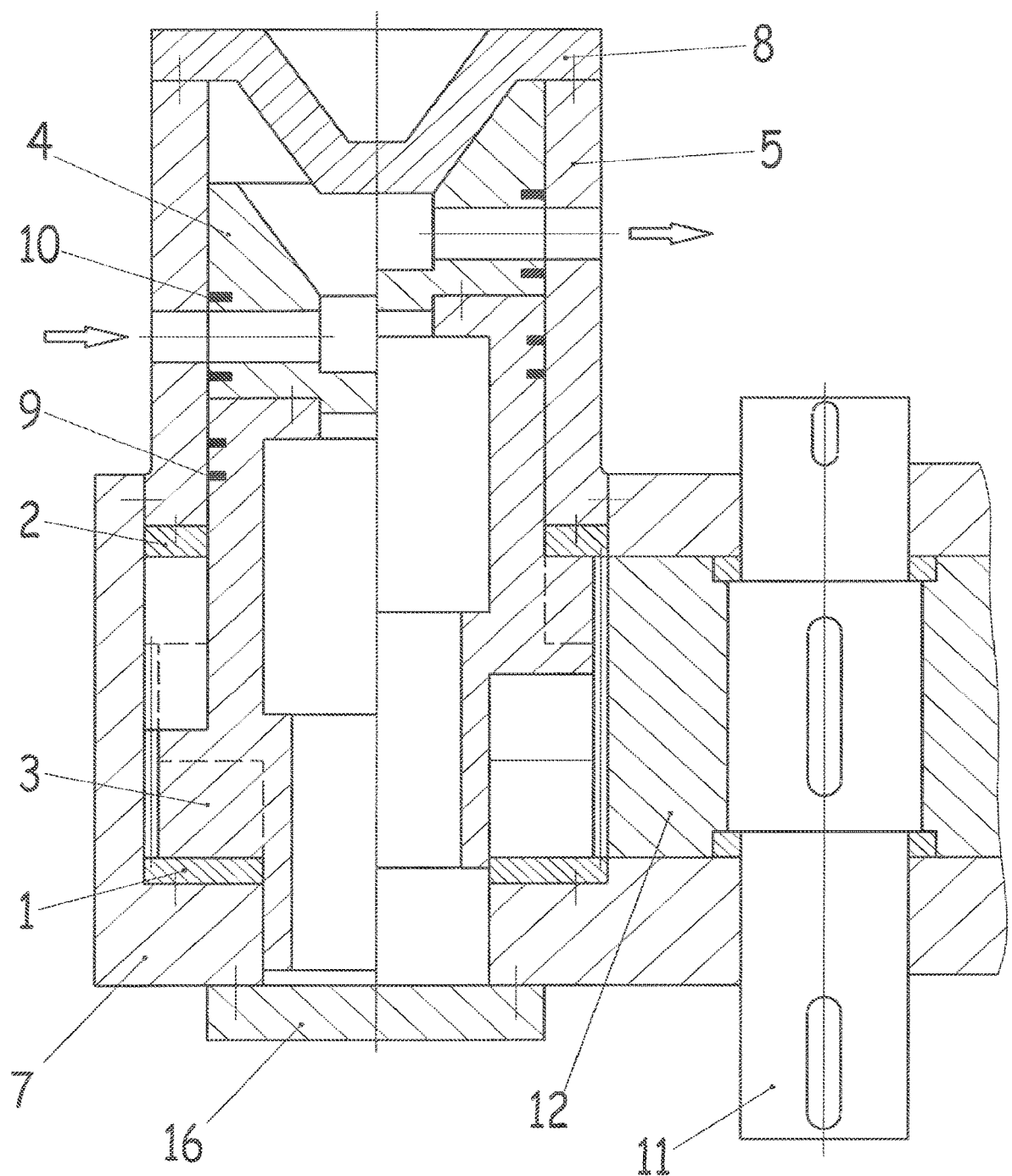
FIG. 6 shows the cylinder of FIG. 5, the difference being that the stator is also a gearwheel cooperating with the rotating axle.
Figure 7:
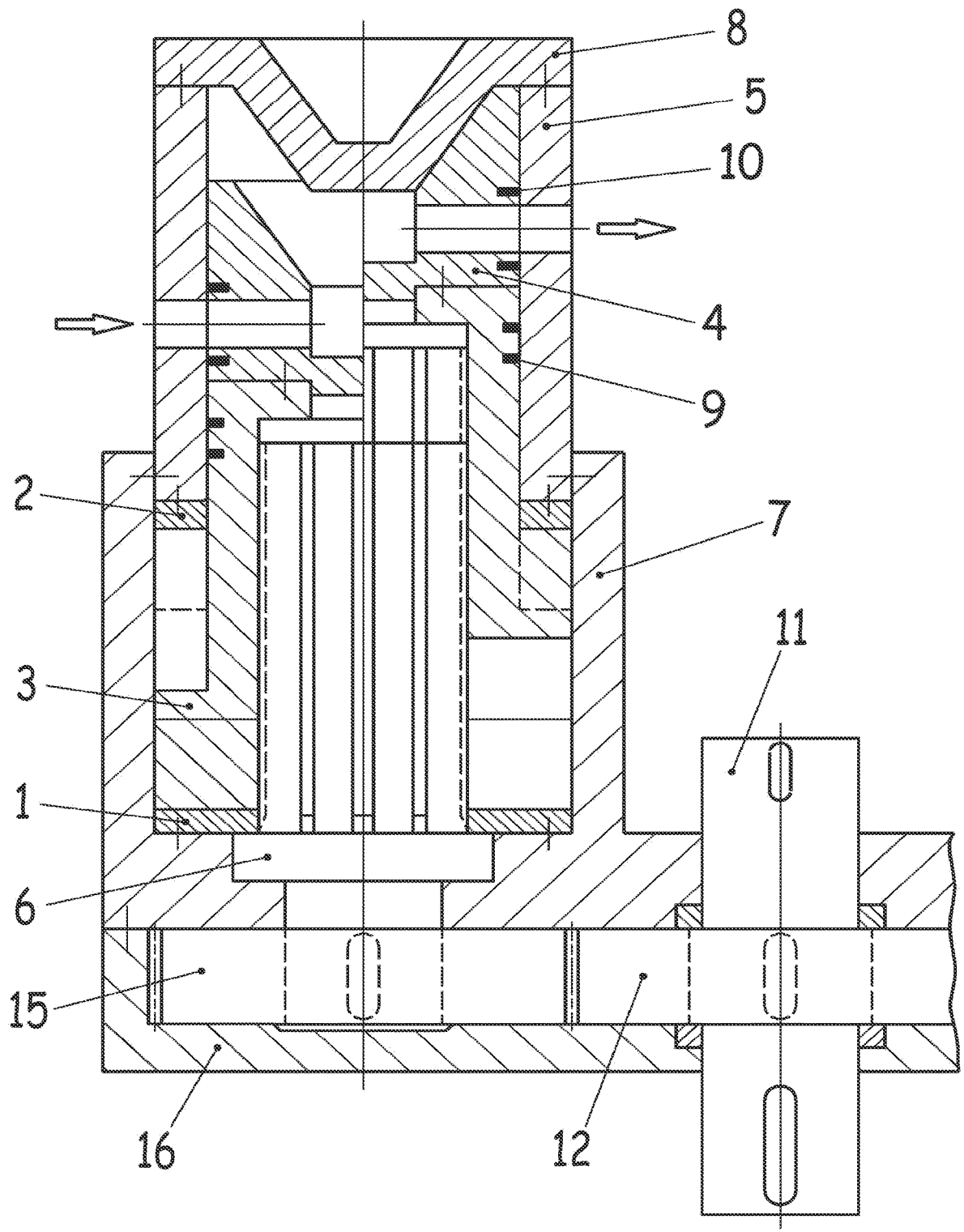
FIG. 7 shows the cylinder of FIG. 5, the difference being that the axle is connected to a gearwheel cooperating with the rotating axle.

FIGS. 5, 6 and 7 show applications in piston engines (motors or pumps/compressors) having an integrated motion transformation mechanism, according to the invention, comprising an additional mechanism with a third annular component 2 and a valve array according to the invention. Said engines comprise one or more cylinders (in parallel and/or opposing arrangement for the neutralization of the inertial forces), wherein the second annular component 3, functioning as rotor, is firmly connected to a cylindrical piston 4 rotating and reciprocating simultaneously. Said engines comprise auxiliary systems (lubrication, refrigeration, fuel, starter etc.) known from the state of the art.

The first and the third annular components 1, 2 operate as stators and are firmly mounted onto a body 7, while rotor 3 is rotating and reciprocating axially according to the invention, moving by means of a spline from an axis 6 coinciding with the axis of the cylinder of the piston engine in FIG. 5, or from axis 6 moving via axle 11 located outside the cylinder, in parallel to its axis, as it arises from FIG. 7, wherein motion is transmitted to the axis through an axle 11 via gearwheels 12, 15. In FIG. 6 motion is transmitted to the rotor by an axle 11 via gear 12 and rack in the rotor external surface 3. The length of the gear rack 12 allows the continuous engagement of the rotor rack 3 as it reciprocates while rotating. Indicator 16 shows a body cover 7.

In FIGS. 5, 6 and 7 the cylinder is supplemented by a cylindrical liner 5, inside which moves—circumferentially contacting—piston 4 covered by a cylinder cover 8. Included also are piston rings 9 and valve spring 10.

In each valve with apertures (one aperture in the liner and one on the piston) of the type of the present invention, one aperture is circular and the other oblong, when fluid is uncompressed. In addition, in applications wherein there are piston hydraulic engines or pumps/compressors and 2-stroke ICEs, the number of valve apertures (both suction and compression) of the type of the present invention is double the number n of crests/valleys, whereas the number of valves of 4-stroke ICEs is equal to n.

Figure 8:
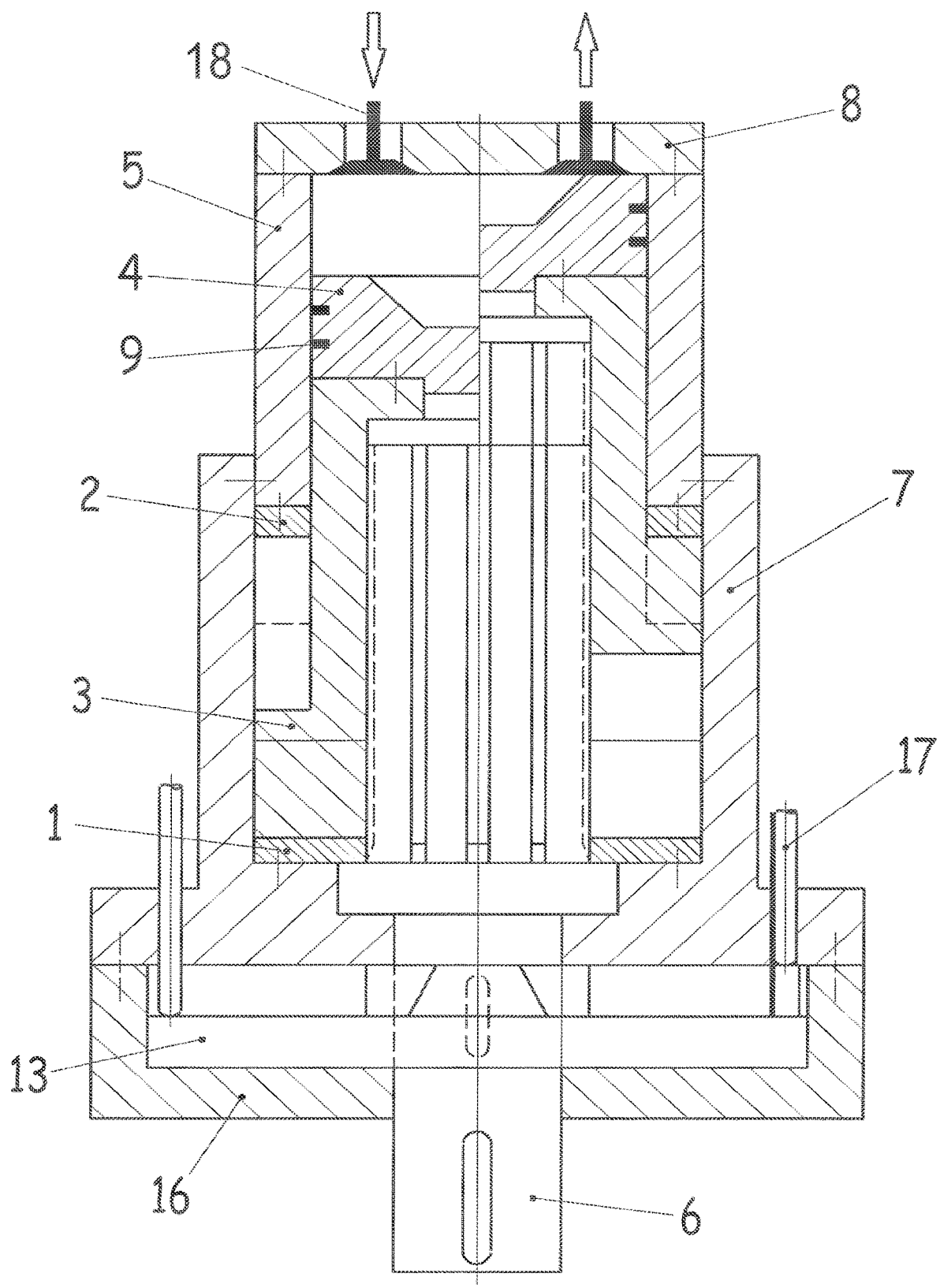
FIG. 8 shows the cylinder of an internal combustion piston engine having a mechanism of transforming the motion according to the invention, conventional valves, rotor cooperating with an axle through a spline, disc-shaped cam on the axle plus a piston reciprocating while rotating.
Figure 9:
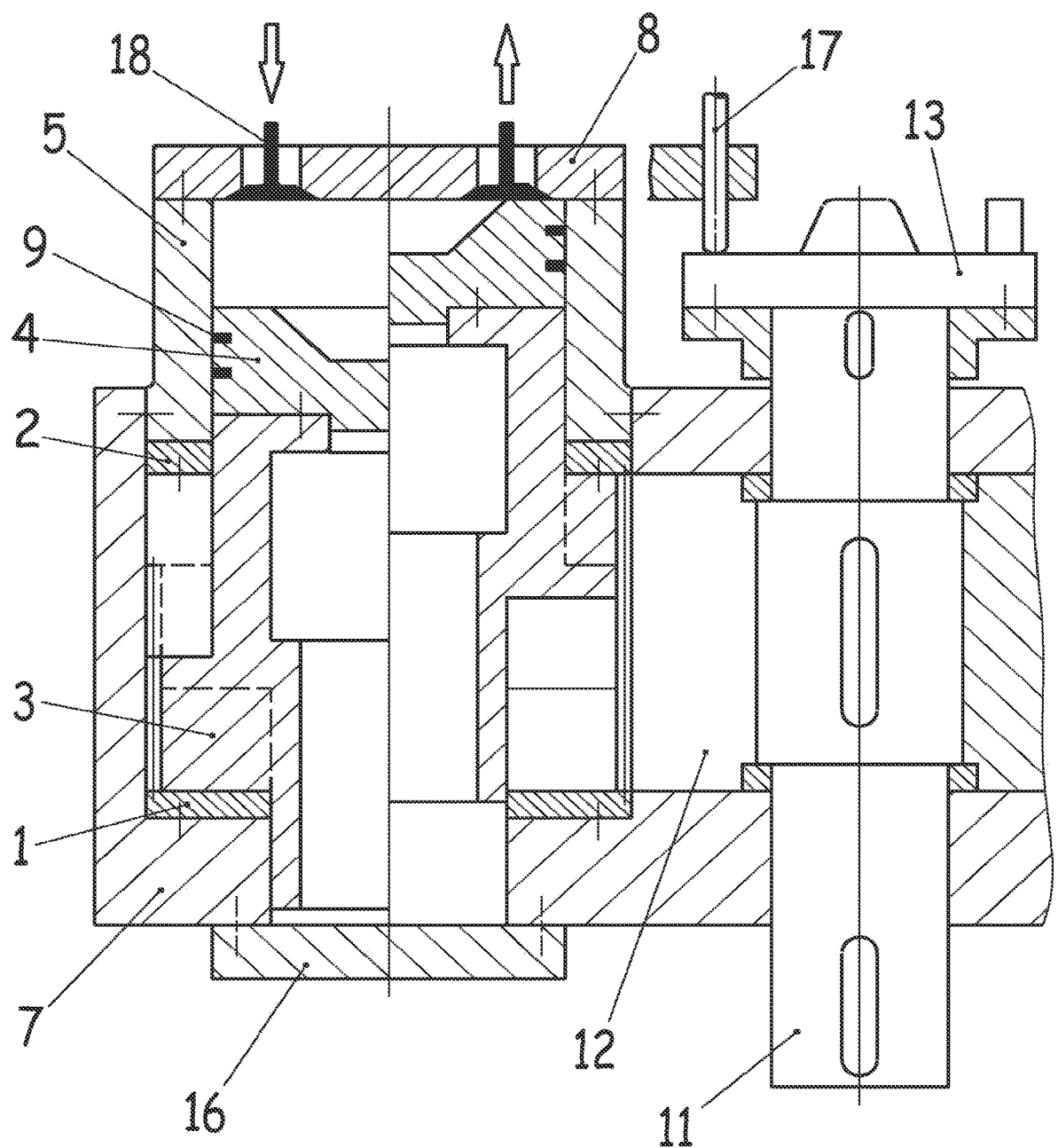
FIG. 9 shows the cylinder of FIG. 8, the difference being that the stator is also a gearwheel cooperating with the rotating axle.
Figure 10:
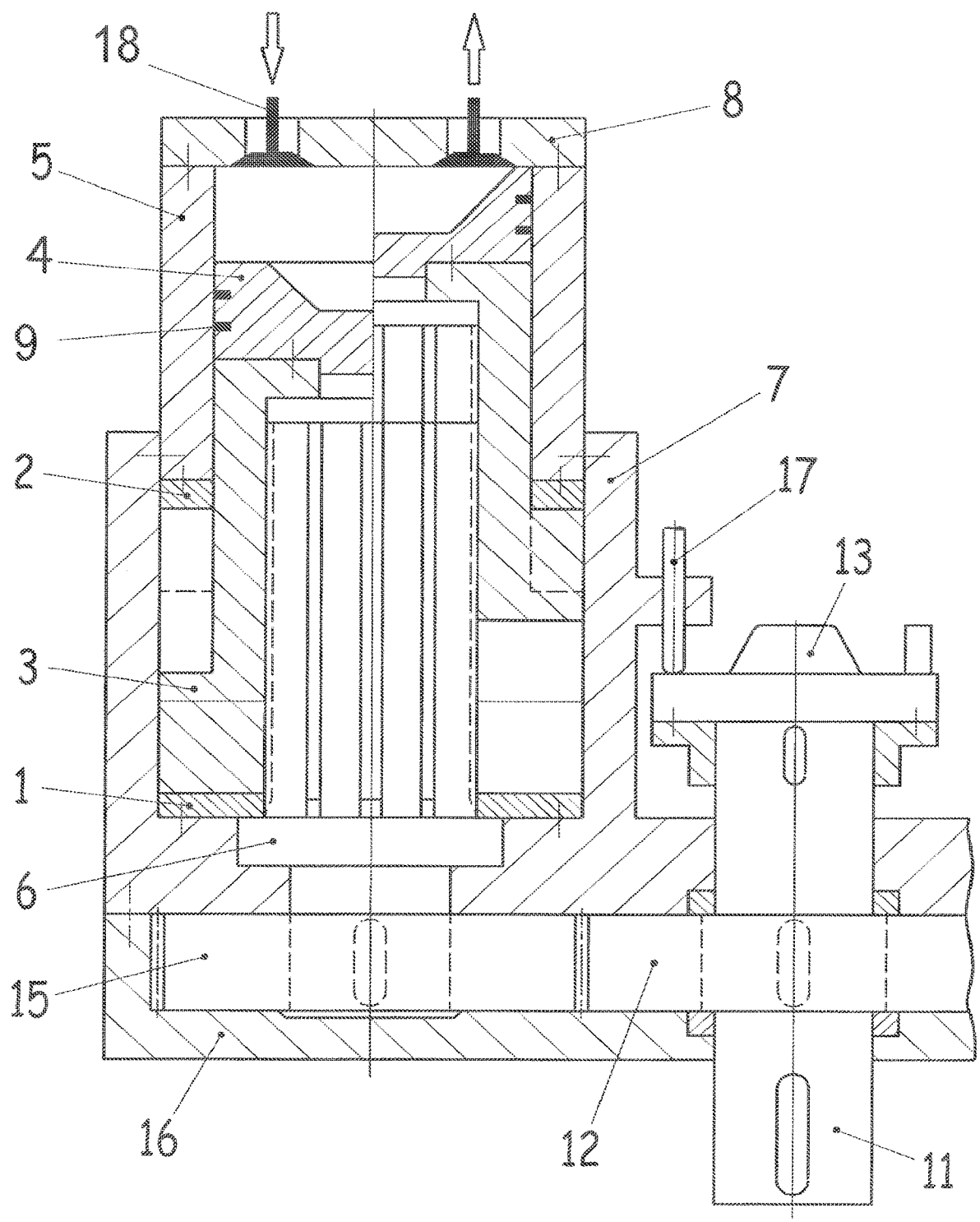
FIG. 10 shows the cylinder of FIG. 8, the difference being that the axle is connected to a gearwheel cooperating with the rotating axle.

In FIGS. 8, 9 and 10 applications are shown in piston engines (motors or pumps/compressors) with an integrated motion transformation mechanism according to the invention including additional mechanism with a third annular component 2, wherein the second annular component 3 functioning as a rotor is firmly connected to piston 4 rotating and reciprocating simultaneously in combination with conventional/classic valves 18. Said engines are constituted by one or more cylinders (in parallel and/or opposing arrangement, for the neutralization of the inertial forces) with a common axle 11 and auxiliary systems (lubrication, refrigeration, fuel, starter etc.) from the state of the art.

FIG. 8 differs from FIG. 5 in that the valve arrangement according to the invention has been replaced by conventional/classic valves 18. A disk-shaped cam 13 can be distinguished fitted directly above axis 6 plus rods 17 required in case of an ICE.

FIG. 9 differs from FIG. 6 in that the valve arrangement according to the invention has been replaced by conventional/classic valves 18. A disk-shaped cam 13 can be distinguished fitted directly above axle 11 plus rods 17 required in case of an ICE.

FIG. 10 differs from FIG. 7 in that the valve arrangement according to the invention has been replaced by conventional/classic valves 18, while in the case of an ICE a disk-shaped cam 13 fitted directly above axle 11 and rods 17 are provided.

Figure 11:
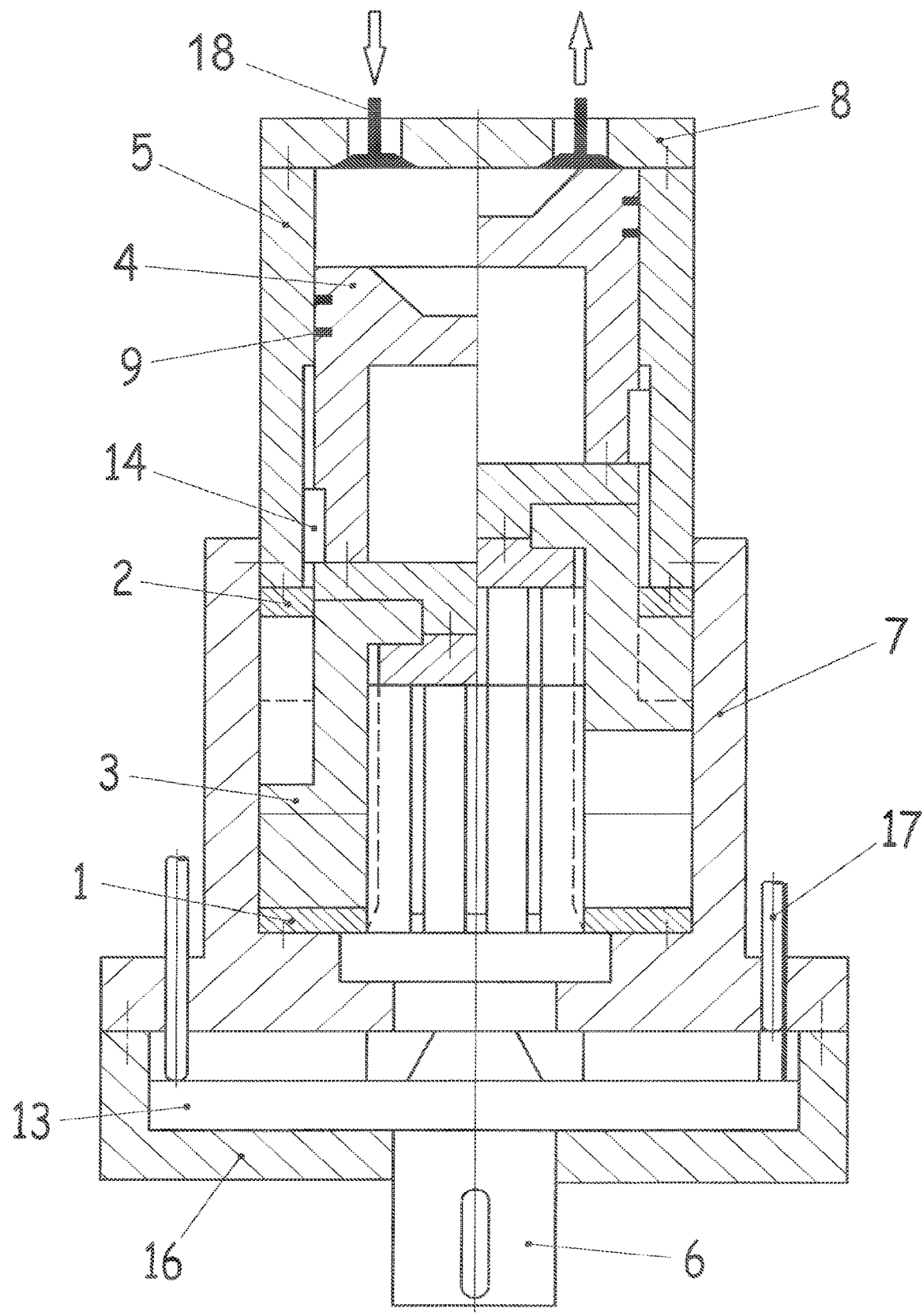
FIG. 11 shows the cylinder of FIG. 8, the difference being that the piston reciprocates without rotating.
Figure 12:
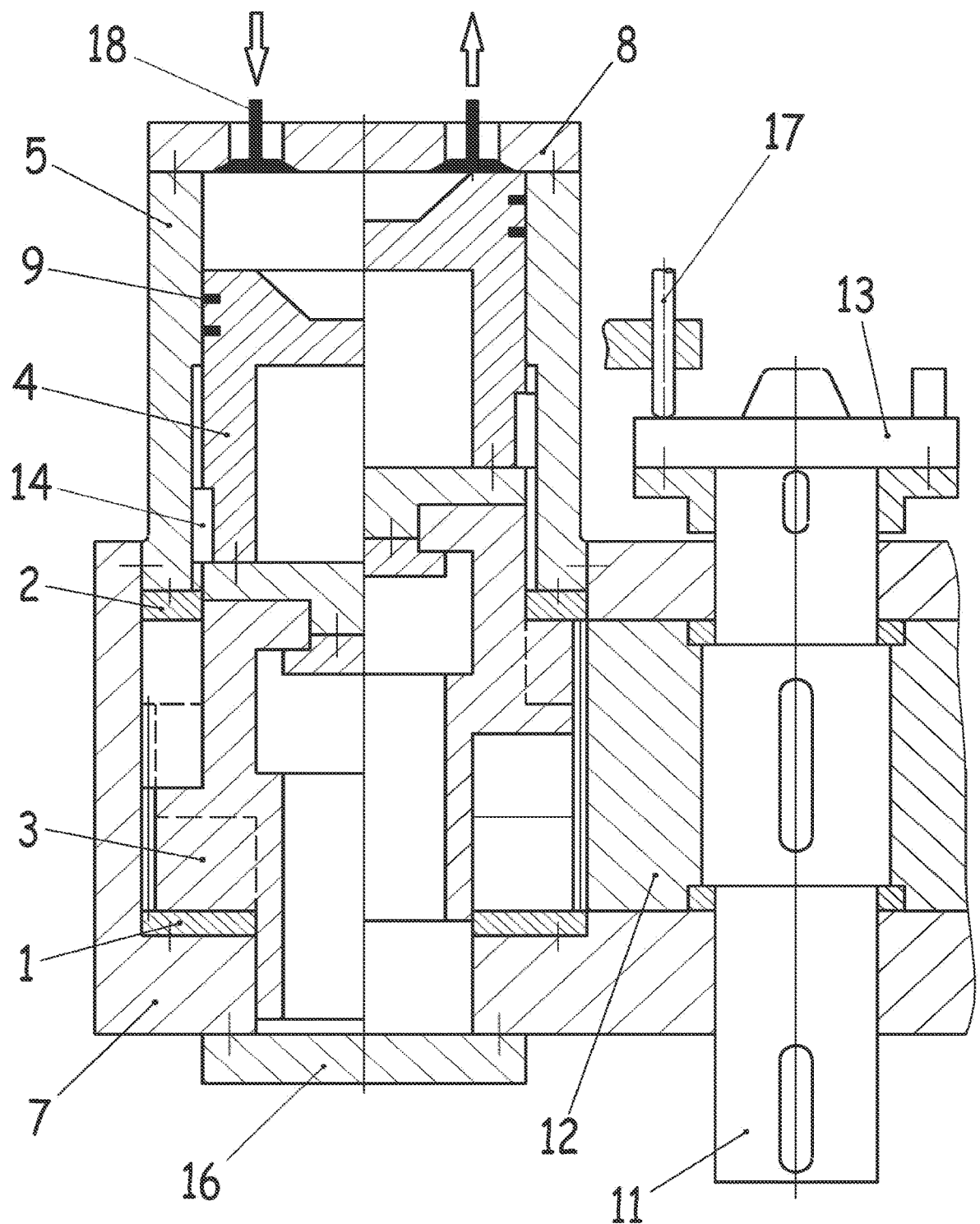
FIG. 12 shows the cylinder of FIG. 9, the difference being that the piston reciprocates without rotating.
Figure 13:
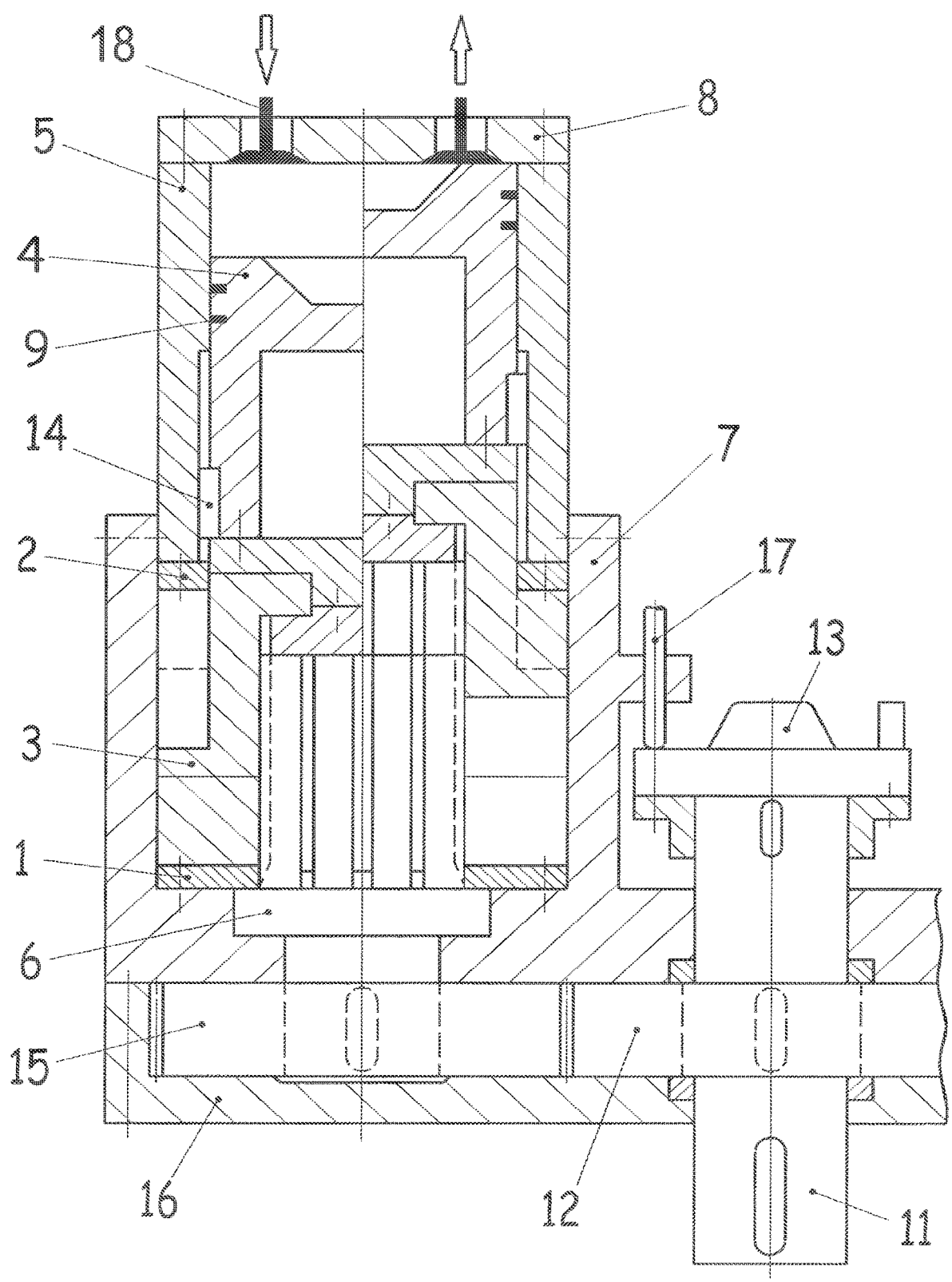
FIG. 13 shows the cylinder of FIG. 10, the difference being that the piston reciprocates without rotating.

FIGS. 11, 12 and 13 differ from FIGS. 8, 9 and 10, respectively, in that piston 4 is connected in such a way to rotor 3 so as to be free not to follow the rotation of rotor 3, causing the rotation of axis 6 or axle 11, and to execute only reciprocating motion inside liner 5. This is achieved through linearly sliding elements 14 (wedges, balls etc.).

Since the piston executes reciprocating motion only inside liner 5, the mechanism described may be combined only with conventional/classic valves 18 and, in case of (ICEs), with a disk-shaped cam 13 fitted directly above axis 6 or axle 11, plus rods 17.

Figure 14:
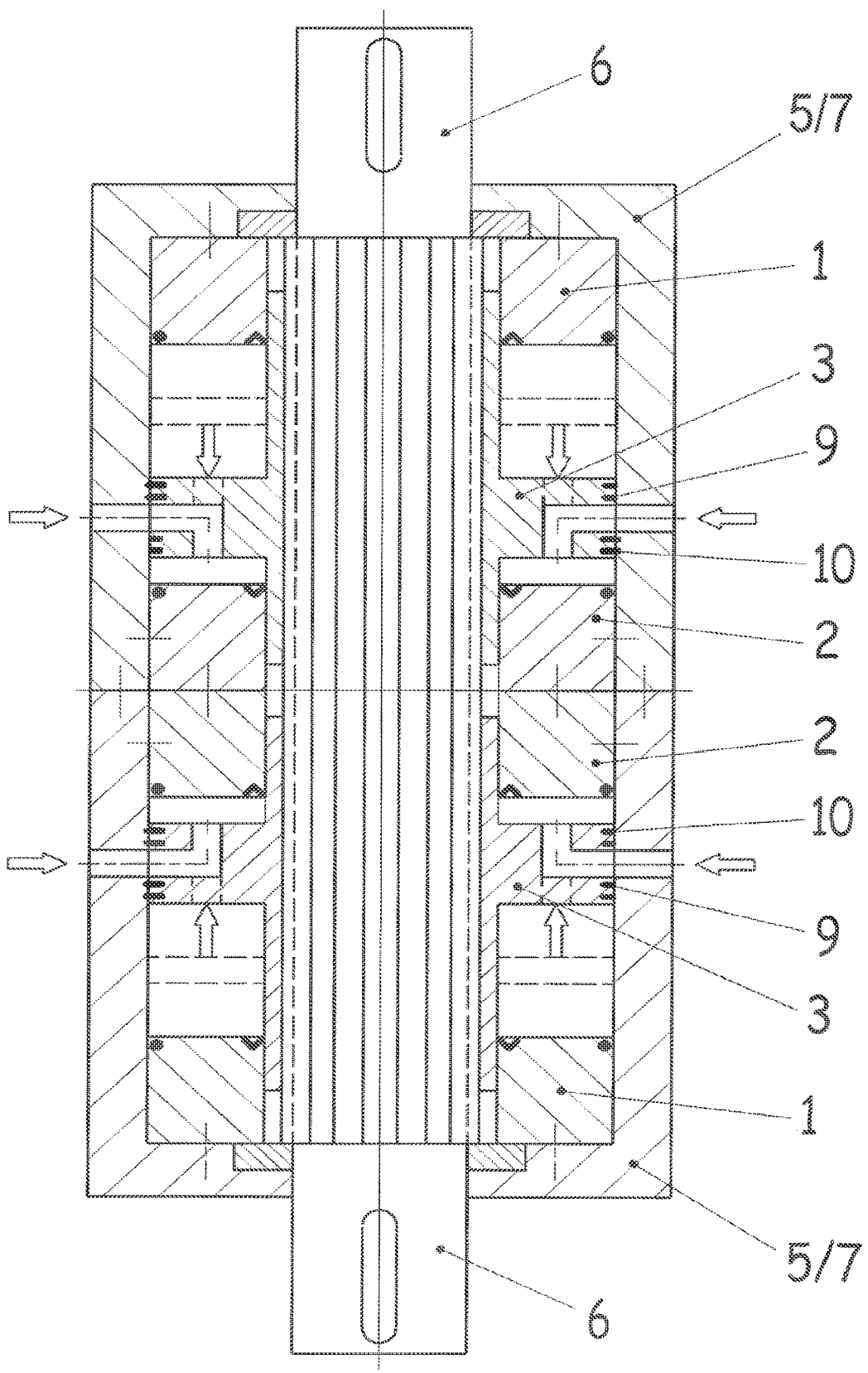
FIG. 14 shows a mirror-image symmetric, two-cylinder, double-effect piston engine, with a motion transformation mechanism according to the invention, valves with apertures or conventional, rotor cooperating with an axle through a spline, wherein the rotor is also a substitute for the piston, since the working fluid operates between the two stators, the rotor and a cylindrical body.

In FIG. 14 another application of a double-effect piston engine (engine or pump/compressor) according to the present invention, wherein the working fluid operates between stators 1 and 2, rotor 3 and a cylindrical liner-body 5/7. Specifically, a double-effect, two-cylinder piston engine is shown, with a motion transformation mechanism, valves with apertures or conventional, rotor 3, rotation on axis 6 with a sliding spline, wherein the role of the piston is effected by rotor 3, since the working fluid operates between the two stators 1 and 2, rotor 3 and cylindrical liner-body 5/7.

As in FIGS. 5 to 13, the engine may function, with simple apertures as valves according to the invention on the stator 3 and the liner-body 5/7, but also with various types of conventional/classic valves above the liner-body 5/7.

In order to neutralize the inertial forces, the indication is to combine, as in FIG. 14, two opposing stators 3 with the corresponding stators 1 and 2 in the same liner-body 5/7, or to combine suitably more cylinders, as in FIG. 15. In this application, the cases of 2-stroke ICEs, hydraulic motors and pumps/compressors are of particular interest.

The engines presented in FIGS. 5 to 14 execute in each of their rotation so many reciprocations as the number n of crests/valleys existing in each undulated surface of stators 1, 2 and rotor 3. The case in which n=1 is infrequent due to the emergence of asymmetric internal forces causing friction forces between piston 4 and liner 5 and relative wear. Usually n=2, thus in 4-stroke ICEs embodying the present invention, each operation cycle is completed in one rotation versus two rotations in the conventional ICEs. This has as a result the doubling (roughly) of power for the same cylinder capacity engines. The effect is opposite—in combination with the absence of piston rod and classic camshaft—in the size/weight of the engine: it is decreased (roughly) by 50% for the same power output. The above apply and are generalized accordingly for n>2.

The same also holds in 2-stroke ICEs wherein once again the power is doubled or the size/weight is decreased by half compared to the conventional 2-stroke engines for the same cylinder capacity or power, respectively.

Finally, in all ICEs incorporating the present invention and using a disk-shaped cam, the absolute control is made feasible of the stroke, timing and duration of activation of the conventional/classic valves, owing to the fact that there are no restrictions in choosing the position and configuring the shape and size of the cams.

In FIG. 15, arrangements are shown based on the applications corresponding to FIGS. 5 to 14, wherein absolute neutralisation is achieved of the inertial forces resulting from the reciprocating masses of rotor 3 and piston 4 without balancing: the arrows show the relative motion in the various cylinders. Whenever it is feasible, the combustion is carried out consecutively in the various cylinders and shared equally in each rotation of axle 11, for reasons of smoothening-out power flow.

Specifically, in FIG. 15 the following interesting cases are set out:
a. 2 cylinders placed in opposing arrangement, with the working fluid chambers at the ends, and with a power output from a parallel axle with two output positions. The specific arrangement constitutes a simple unit of autonomous operation (SUAO) with the reciprocating inertial forces balanced completely.
b. 2 cylinders placed in opposing arrangement, with the working fluid chambers unified or not in the centre, and with a power output from a parallel axle with two output positions. In ICEs, the unified chambers case is at a disadvantage relative to the separate chambers case, due to half of the combustions taking place, resulting in greater fluctuations in the power flow curve. This arrangement constitutes another version of a simple unit of autonomous operation (SUAO).
c. 4-Cylinder or multi-cylinder engine composed by units from case 15.*a* for smoother operation, and/or greater power with a single output.
d. 4-Cylinder or multi-cylinder engine composed by units from FIG. 15.*b* for smoother operation, and/or greater power with a single output.
e. 4 Cylinders arranged in parallel on the same level, with two power outputs constituting the extension of axes 6.
f. 4 Cylinders arranged in parallel on the same level, with a parallel power output at the centre with two ends.
g. 4 Cylinders arranged in parallel and in a circle (every 90□), with a parallel power output at the centre with two ends.
h. 4 Cylinders arranged in parallel and in a circle (crosswise), with a parallel power output at the centre with two ends.

Moreover, for the applications of FIGS. 5 to 14, the following remarks are in effect:
1. The working fluid operates inside liner 5, between the free surface of piston 4 and cover 8.
2. In FIGS. 5, 7, 8, 10, 11, 13 and 14, axis 6 coincides with the cylinder axis.
3. In FIGS. 6, 9 and 12, axle 11 is positioned outside the cylinder, in parallel to its axis. The motion from axle 11 to rotor 3 is transmitted via gear 12 and rack on the rotor 3 external surface. Reverse applies as well. The length of the gear rack 12 allows the continuous engagement of the rotor rack 3 as it reciprocates while rotating.
4. In FIGS. 8 and 11, wherein conventional valves 18 are used, the disk-shaped cam 13 is positioned onto axis 6.
5. In FIGS. 9, 10, 12 and 13, wherein conventional valves 18 are also used, the disk-shaped cam 13 is positioned onto axle 11, and on its disk it bears only one set of cams.

These cases are recommended for multi-cylinder engines provided that the cylinders are arranged in parallel and an equal distance (circularly) round the single axle 11 (see FIGS. 15*g* and 15*h*).
6. In FIGS. 7, 10 and 13, axle 11 is driven by axis 6 via a pair of gearwheels 12 and 15. Reverse applies as well.
7. In FIGS. 8 to 13, when reference is made to applications in piston hydraulic motors or pumps/compressors, suitable conventional/classic valves are used according to the specific configuration, μ alves, piston-rods and the crankshaft disk (referring to ICEs) are abolished.
8. In FIGS. 5, 6, 7 and 14, when reference is made to applications in piston hydraulic motors or pumps, in each pair of valves with apertures (present invention type) one is circular and the other oblong, when the fluid is uncompressed.
9. In FIGS. 5, 6, 7 and 14, when reference is made to applications in piston hydraulic motors or pumps/compressors and 2-stroke ICEs, the number of valve apertures (present invention type) is double that of the no. of valves in 4-stroke ICEs.
10. In FIGS. 5, 7, 8, 10, 11, 13 and 14 rotation and the simultaneous reciprocation of rotor 3 are achieved with a spline above axis 6, whereas in FIGS. 6, 9 and 12 via gearwheel 12 and external rack on rotor 3.

In the cases described by means of the illustrations of FIGS. 5 to 14, the transformation of rotational to reciprocating motion and vice versa is carried out due to the sliding of surfaces $\Gamma_\alpha$ and $\Gamma_\beta$ of the second annular component 3, which may also function as a rotor, onto surfaces A and B, respectively, of the first and third annular components 1 and 3, which may function as stators, as shown in FIGS. 2, 3 and 4. The same result emerges also in case surfaces $\Gamma_\beta$ and β are eliminated and the second annular component 3 is forced to be pushed onto the first annular component 1, in order for surface $\Gamma_\alpha$ to be in continuous contact with A. This may be achieved e.g. in the following ways replacing the third annular component 2:
1. Using spring(s) exerting pressure on rotor 3, in combination with bearings, except in special cases (as in the case of FIG. 20).
2. With two diametrically opposed rollers, mounted on rotor 3, rolling onto a suitable undulated surface formed on stator 2, similar to surface B (FIG. 2), in order for the axes of the rollers to trace curve ω of FIG. 3 or 4.
3. Using pressure (hydraulic or pneumatic) on rotor 3.

4. Using an arrangement of magnetic/electromagnetic force on rotor 3.

5. Using the force of gravity (only for engines with vertical cylinders).

Finally, the present invention applies to all kinds of engines and automations wherein transformation of rotational to reciprocal motion or the reverse is taking place, such as in mechanical presses, nail making machines, sewing machines, printing machines etc.

In FIG. 16.*a* the arrangement of a clutch is shown comprising a first annular component 1 connected to axis 6 with an axially slipping spline, a component (secondary axis) 4 connected firmly to the second annular component 3, at the same time a special mechanism, according to the state of the art, may exert an axial force F on the first annular component 1 and forces its crests to enter the valleys of the second annular component 3. In this condition the rotation of axis 6 is transferred totally to the secondary axis 4. If the axial force F on the first annular component 1 is lifted, it will recede and disengage from the second annular component 3, in which case the transfer of rotation from axis 6 to secondary axis 4 will be interrupted.

In FIG. 16.*b* a more effective clutch arrangement is shown, wherein axis 6 is connected via a sliding spline to rotor 3, i.e. with the second annular component, stator 2, i.e. the third annular component, is connected firmly to component (secondary axis) 4, on the other hand in this initial position/condition rotor 3 slides simultaneously and moves freely between stators 1 and 2, without affecting their kinematic condition. Moreover, a special mechanism, according to the state of the art, may exert an axial force F on stator 1, forcing the first and third annular components 1 and 2 to approaching sufficiently each other. In this new condition, rotor 3 is immobilized between stators 1 and 2; therefore the rotation of axis 6 is transferred in full effect to the secondary axis 4. If the axial force F on stator 1 is lifted, by the special mechanism, it will recede to its initial position/condition, rotor 3 will be released and start moving again by sliding between stators 1 and 2, and the transfer of rotation from axis 6 to secondary axis 4 will be interrupted.

Optionally, stators 1 and 2 are connected externally to a liner 7: the first with axially sliding wedges 14, and the third enabled to rotate only slightly.

The special mechanism exerting force F enjoys wide application in the current state of the art, it may be somewhat equivalent to the mechanisms encountered in the clutches of all sorts of vehicles (cars, trucks, tractors etc.) and it may work mechanically and/or hydraulically, and/or pneumatically etc.

A feature/advantage of such a clutch is the simple and compact construction, but mainly, the transfer of motion with mechanical engagement, not friction, resulting in the (almost complete) lack of wear, on account of the absence of friction during the sliding action of the cooperating parts, due to the hydrodynamic lubrication thereof.

In FIG. 17.*a* an arrangement for a differential is shown, comprising two mirror-image symmetric sections, each one of them consisting of a first annular component 1 and a second annular component 3 connected to an axis 6 with a sliding spline. A special mechanism, according to the state of the art, exerts force F on the first annular component 1 and keeps it engaged with the second annular component 3. Each one of the two annular components 3 is connected firmly to a gearwheel 15 moving through axis 11 via the cooperating gearwheel 12. As long as the resistance of two the axes 6 in motion is the same, the first annular components 1 remain engaged with the second annular components 3, and the rotation of gearwheel 15 is transferred to its full effect to axes 6. Should the resistance grow in one of the axes 6, the corresponding first annular component 1 will recede and the no. of rotations of the corresponding axis 6 will be decreased, at the same time the other axis 6 will continue moving normally until equilibrium in the resistances of their axes 6 returns, and previous operation is restored. That is to say, the arrangement functions as a simple differential. In order to avoid the disadvantage of the immobilization of one axis 6 and the rotation of only the other one, in case the resistance of the latter is zero, it is imperative that control offerees F and rotations of axes 6 is exercised by means of electronic assistance. In this case both axes may be blocked completely and both axes may be rotating with the same speed: limited slip differential "LSD".

In FIG. 17.*b* a more effective differential arrangement is provided as a combination of the arrangements presented in FIGS. 16.*b* and 17.*a*, the combined descriptions of which provide the operating mode of this particular type of differential. The differential arrangement comprises two mirror-image symmetric sections, each one consisting of the second annular component 3, functioning as a rotor, connected to an axis 6 by means of a sliding spline, a first annular component 1 and a third annular component 2. In this initial position/condition rotor 3 slides, and at the same time moves freely, between stators 1 and 2 without affecting their kinematic condition. A special mechanism, according to the state of the art, exerts a force F on the first annular component 1 moving to the third annular component 2, entrapping and immobilizing second annular component 3 between the first and the third component 1 and 2, such that the third annular component 2 is engaged firmly and moving simultaneously to axis 6. The two mirror-image symmetric sections are connected firmly via third annular components 2 to a gearwheel 15, moving from one axis 11 via a cooperating gearwheel 12. The operation of the arrangement as a differential is determined by the entrapping and immobilization or not of the second annular component 3. Thus, for as long as the resistance of two axes 6 during motion is the same, the second annular components 3 remain in engagement with the third annular components 2 and the rotation of the gearwheel 15 is transported to its full effect to axes 6, on the other hand if the resistance grows on one of the axes 6, the corresponding first annular component 1 will recede slightly, the corresponding second annular component 3 will be released and it will begin to slide simultaneously and to move freely between the first and the third annular components 1 and 2, thus the no. of rotations of the corresponding axis 6 will decrease until the balance of the axes 6 resistances is restored, and the arrangement returns back to its initial position/operating condition.

Optionally, the first annular component 1 is connected to a body 7 via the use of axial sliding 14, and the third annular component 2 is connected to body 7 having the capability of slight circumferential sliding.

The special mechanism of exerting force F, just as in the differential arrangement applications of FIGS. 16.*a* and 16.*b*, may operate mechanically and/or hydraulically, and/or pneumatically etc., with or without electronic assistance.

A feature/advantage of such a differential is the simple and compact construction, but mainly, the transfer of motion via mechanical engagement, not friction, resulting in the (almost complete) lack of wear, owing to the absence of friction during the sliding action of the cooperating parts, because of the hydrodynamic lubrication thereof, as well as the ability to operate as an "LSD" differential.

In FIG. 18.*a* a first mechanism for the transformation of rotational to reciprocal motion or vice versa is shown, according to the present invention, with $n=n_1$ number of crests and valleys, wherein a first and a third annular component 1 and 2 function as stators and are mounted firmly on a body 7, while the second annular component 3 is moved by an axis 6 with a sliding spline and functions as a rotor firmly connected to a piston 4 turning and reciprocating axially, connected coaxially via a pin 19 to a second similar mechanism, with the same reciprocation path L and a number of crests and valleys $n=n_2 \neq n_1$, via pistons 4 in such a way as to allow for rotation relative to each other, however, not axial displacement. In this case, if axis 6 of the first mechanism rotates with $N_1$ rotations, then axis 6 of the second mechanism will be rotating with $N_2=N_1 \times (n_1/n_2)$ rotations, i.e., the pair of mechanisms functions as a rotation speed increasing-reducing device.

In FIG. 18.*b*, respectively, axes 6 of the two mechanisms are connected coaxially via wedges 14 of a coupler 20 in a fixed way, therefore the pair of mechanisms functions as a reciprocating speed increasing-reducing device. In the latter case, it may function also and/or as a reciprocation-path length increasing-reducing device L, provided the reciprocation-path length $L_1$ of the first mechanism differs from the reciprocation-path length $L_2$ of the second.

A feature/advantage of such an increasing-reducing device is the in-line (coaxial) arrangement and the capability, in addition to increase/reduce the no. of rotations, to achieve the increase/reduction of the no. of reciprocations as well, with or without altering the path length.

Figure 19:
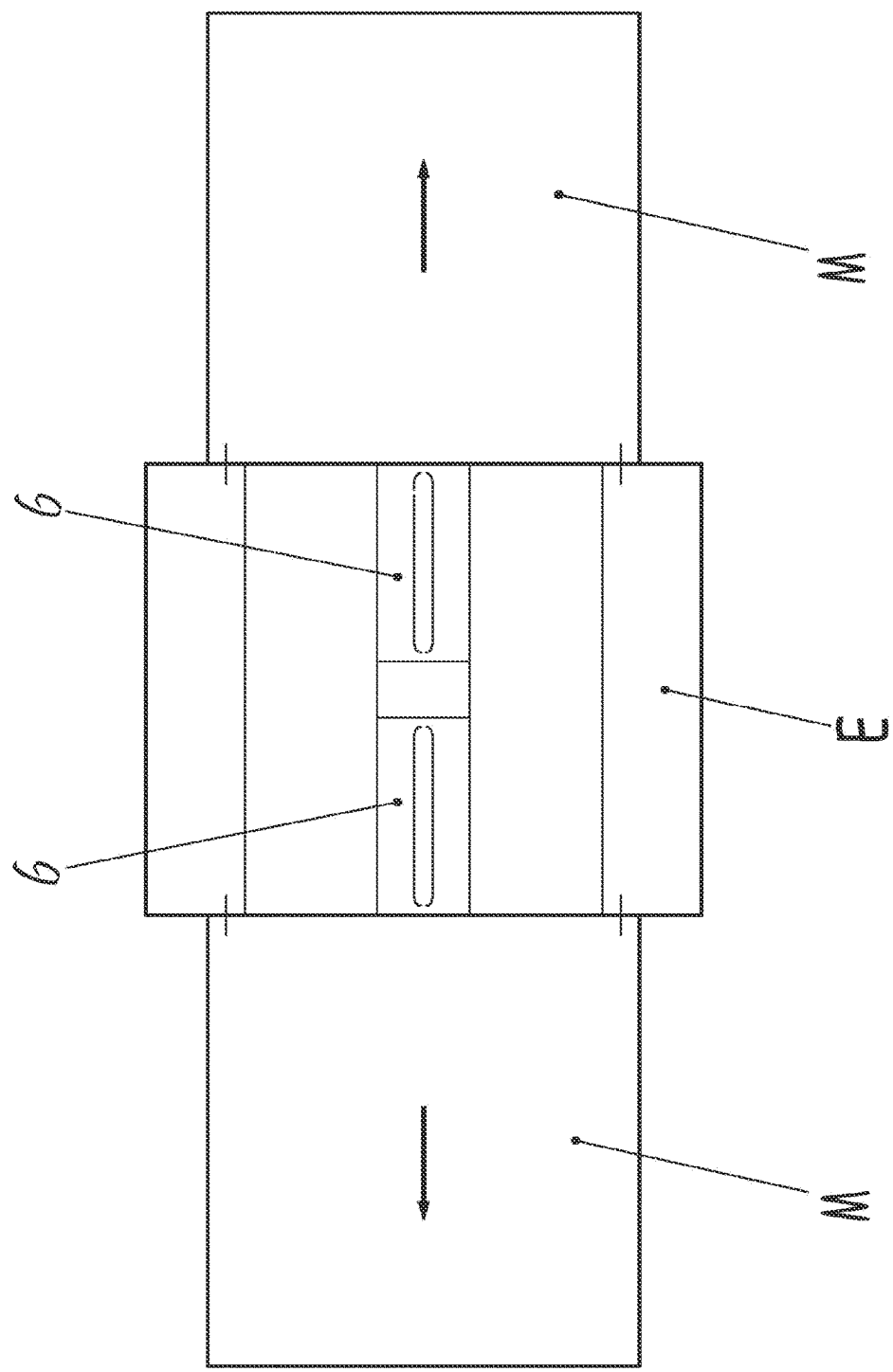
FIG. 19 shows the coupling of an electrical engine (power generator/electric motor) with two engines (motors or pumps/compressors, respectively) based on the motion transformation mechanism according to the invention.

FIG. 19 shows the coupling of an electrical engine (power generator/electric motor) with two similar engines M (motors or pumps/compressors, respectively) as those described in the applications reported in FIGS. 5, 8 and 11 of the present invention. The bodies of engines M are mounted coaxially onto the body (stator) of the electrical engine E: one on the right and the other on the left. The rotor axis of the electrical engine E is abolished and it is substituted by axes 6 of engines M, and in doing so they get synchronized relative to each other, resulting in operating with pistons moving in opposing directions in order for the inertial forces of reciprocation to balance out. This type of coupling corresponds to FIG. 15.*a*, however it offers an advantage over it, since the parallel axis is absent, having been substituted by the electrical engine rotor.

A feature/advantage of such an electromechanical pair is its simplicity, the particularly small size/weight, the high power concentration and the compactness (compact) of the construction compared to other conventional cases.

In FIGS. 5 to 14, the described engines of the present invention may function as 2-stroke petrol engines with clean fuel (no lubricant addition). Fuel injection with spraying is required, input of air using a compressor (turbo), a construction allowing the delay of motion inversion in TDC and BDC according to the present invention, and valves with apertures according to the present invention, or controlled by a disk-shaped cam, and regulated (a possibility also provided by the present invention) to operate in the following order—as soon as the expansion phase is completed and just before the piston reaches BDC, the output valve opens and most of the exhaust gases escape, then the input valve opens and the incoming air under pressure forces out the remainder of the exhaust gases (sweeping/flushing), the outlet valve closes followed by the inlet valve once the cylinder is filled with air, and motion inversion starts towards TDC. Next come compression phase, injection, ignition and combustion of the fuel and, finally, expansion, and a new identical cycle starts all over again.

A feature/advantage of such a 2-stroke petrol engine is its small size/weight, roughly half that of a conventional 2-stroke petrol engine of the same power output, plus its non-polluting operation, i.e. the emission of exhaust gases comparable quality-wise to those of a 4-stroke petrol engine, contrary to the polluting exhaust gases of the conventional 2-stroke petrol engines.

The described engine may also operate the same way as a diesel engine.

In both cases (petrol engine or diesel engine) its size/weight is roughly one quarter the corresponding conventional 4-stroke engine size/weight.

In FIG. 20 the application of a mechanism in a two cylinder piston engine is shown, corresponding to that of FIG. 15.*a*, wherein the cylinders are coaxial, mounted in a mirror-image arrangement, with two components 4 moving in opposing directions—functioning as pistons—for balancing the inertial forces of reciprocation and characterized in that each cylinder operates with a pair of annular components with undulated surfaces transforming motion on their adjacent sides, according to the present invention, and their continuous contact ensures a force being exerted continuously onto the piston, as it moves from TDC to BDC and vice versa.

More specifically, in FIG. 20, each cylinder comprises a first annular component 1 functioning as stator, a second annular component 3 functioning as rotor connected firmly to a piston 4. The stators 1 are connected firmly between them and with a common body 7. Each rotor 3 carries an external rack cooperating with a gearwheel 12 mounted on a common axis 11, parallel to the longitudinal axis of the cylinders. Gearwheels 12 synchronize rotors 3 and transfer motion to axis 11. A force is exerted on pistons 4, as they move between TDC and BDC, which is due to the pressure of the working fluid and/or the assistance of a pulling spring 21, keeping the undulated surfaces of rotors 3 in contact with the corresponding stators 1. The pulling spring 21 connects pistons (4) between them through apertures in the stators 1, therefore it acts assisting their recovery, holding rotors 3 in continuous contact with the corresponding stators 1, a fact particularly important during the period of time the engine is not operating, thus avoiding its detuning. Each cylinder comprises valves according to the invention or conventional/classic valves 18, in combination with a disk-shaped cams 13, and rods 17. Such engines are the 2-stroke ICEs, the hydraulic and air motors, wherein the force onto the piston is due to the pressure of the working fluid. Pumps/compressors constitute a similar case, wherein the force onto the piston at the phase of suction is exerted exclusively by the pulling spring 21; as regards remaining elements, the same apply as set out in the case of motors.

A feature/advantage of such an engine is its simplicity, the particularly small size/weight, the high power concentration and the compactness of construction compared to other conventional cases.

The advantages of the mechanisms of the present invention, in comparison to the disadvantages of the already existing ones, as well as the advantages of their implementation in piston engines (motors or pumps/compressors) and in automations are the following:

1. The exceptionally simple construction and the very small number of components required for their implementation.
2. The minimal number of moving components: only axle 11 or axis 6, rotor 3 and piston 4.

3. The possibility of implementing the valve arrangement with simple apertures without additional components and/or mechanisms.

4. The possibility of combining with conventional valves 18 and cams (ICE) in a disk-shaped cam 13 onto axis 6 or axle 11. The cams may be shaped in suitable configurations, so that they may open and close the valves more effectively in the predetermined times.

5. The possibility of achieving an absolutely harmonic reciprocation without higher order harmonics.

6. The reciprocating motion of piston 4 may be realized in various ways and described by simple mathematical equations. Typical cases of equations are the sinusoidal and the polyonymic.

7. The possibility of delaying the piston motion inversion in TDC and BDC for better combustion and improved efficiency.

8. The possibility of neutralizing completely the inertial forces of the reciprocating motion without balancing, only with the proper cylinder arrangement.

9. The substantial absence of friction and wear between piston 4 and liner 5 due to the entire lack of transverse forces between them.

10. The sub-multiple force (half being the maximum, for n=2), exerted at the points of contact of the undulated sliding surfaces A, B and $\Gamma_\alpha/\Gamma_\beta$ of stators 1, 2 and rotor 3, in relation to the force exerted at the point of contact of the gudgeon pin-piston rod of a conventional engine.

11. The minimization of friction and wear of the sliding undulated surfaces A, B and $\Gamma_\alpha/\Gamma_\beta$ of stators 1, 2 and rotor 3 respectively, because of the dynamic lubrication developed due to the favourable geometry.

12. The manufacturing capability of antipollution technology 2-stroke ICEs of a size/weight/cost roughly 50% that of the conventional 2-stroke ICEs or 25% that of the conventional 4-stroke ICEs.

13. The compact construction of multi-cylinder engines: it is possible to arrange the cylinders in line with one (FIG. 15.*f*) or two opposing axles (FIG. 15.*e*), or crosswise and crossways with a central axle (FIGS. 15.*g* and *h*, respectively).

14. The roughly 50% size and/or volume reduction for the same power output and, consequently, the doubling of the power concentration. Reverse applies as well.

15. The roughly 50% reduction of the cost, due to the corresponding reduction of the size and/or volume for the same power output.

FIGURE INDICES

1. First annular component, stator.
2. Third annular component, stator.
3. Second annular component, rotor.
4. Piston or secondary clutch axis.
5. Liner.
6. Axle with sliding spline.
7. Body.
8. Cylinder cover.
9. Piston rings.
10. μ alve spring (aperture).
11. Axle (common).
12. Axle gearwheel.
13. Cam disk.
14. Sliding element (wedge).
15. Axis gearwheel.
16. Body cover.
17. μ alve rod.
18. Conventional/classic valve.
19. Coupling pin.
20. Coupler.
21. Pulling spring.

The invention claimed is:

1. A mechanism for transforming rotating to reciprocating motion, or vice versa, wherein the mechanism comprises:
a first component and a second component, the first component beside the second component, along a longitudinal axis, wherein both of the first and the second components are able to rotate around the longitudinal axis and to reciprocate along the longitudinal axis,
wherein a surface of the first component adjacent to the second component is in continuous contact, in at least one point, with a neighboring surface of the second component, such that the second component is able to move in relation to the first component in continuous contact in at least one point with the adjacent surface of the first component, the contacting surfaces are characterized by n (natural number≠0) repeated pairs of geometrically similar crests and valleys with a similarity ratio of 1:3, the similarity ratio being defined as a ratio of coordinates of two similar geometric shapes using a common coordinate system wherein the coordinates of a first geometric shape result from multiplying corresponding coordinates of a second geometric shape by the similarity ratio.

2. The mechanism of claim 1, wherein the mechanism is configured such that if the first component and the second component rotate relative to each other, remaining at the same time in continuous contact, then at the same time they will reciprocate relative to each other with a frequency n-times the corresponding rotational motion frequency, between a TDC (Top Dead Center) and a BDC (Bottom Dead Center).

3. The mechanism of claim 1, wherein the mechanism is configured such that if the first component and the second component reciprocate relative to each other, between a TDC (Top Dead Center) and a BDC (Bottom Dead Center), remaining at the same time in continuous contact, then at the same time they will rotate relative to each other with a frequency 1/n-times the corresponding reciprocation motion frequency.

4. The mechanism of claim 1, wherein at least one of the first component and the second component is connected to an additional component.

5. The mechanism of claim 4, wherein the additional component is connected to the at least one of the first component and the second component (i) firmly or (ii) with independent freedom of motion.

6. The mechanism of claim 4, wherein the additional component comprises a piston and further comprising:
a liner, inside which moves, the piston.

7. The mechanism of claim 1, further comprising a first aperture and a second aperture, wherein the first and second apertures at least partially overlap periodically upon movement of the mechanism, allowing for periodic fluidic communication between the apertures.

8. The mechanism of claim 1, further comprising an additional mechanism adapted to force the second component onto the first component.

9. The mechanism of claim 8, wherein the additional mechanism comprises a mechanism selected from the group consisting of a pneumatic mechanism, a hydraulic mechanism, a gravity mechanism, a magnetic mechanism, an electromagnetic mechanism, and a spring mechanism.

10. The mechanism of claim 8, wherein the additional mechanism comprises a third component mounted in relation to the first and the second components such that the second component is located between the first and the third components, wherein the third component comprises a third surface in continuous contact, in at least one point, with an opposing surface of the second component, the contacting surfaces are characterized by n (natural number≠0) repeated pairs of geometrically similar crests and valleys with a similarity ratio of 1:3.

11. The mechanism of claim 10, wherein at least one of the first component, the second component and the third component is connected to an additional component.

12. The mechanism of claim 11, wherein the additional component is connected to the at least one of the first component, the second component and the third component (i) firmly or (ii) with independent freedom of motion.

13. The mechanism of claim 11, wherein the additional component comprises a piston and further comprising:
a liner, inside which moves, the piston.

14. The mechanism of claim 10, further comprising a first aperture and a second aperture, wherein the first and second apertures align periodically upon movement of the mechanism, allowing for periodic fluidic communication between the apertures.

15. The mechanism of claim 10, wherein the first and third components are static and are firmly mounted onto a body, while the second component reciprocates and rotates.

16. The mechanism of claim 10, wherein the first and third components rotate and the second component reciprocates but does not rotate.

17. The mechanism of claim 10, wherein the second component rotates and the first and third components reciprocate but do not rotate.

18. The mechanism of claim 10, wherein the second component is static and the first and third components reciprocate and rotate.

19. The mechanism of claim 10, wherein the mechanism is adapted to operate as a 4-stroke engine.

20. The mechanism of claim 19, wherein the mechanism is configured to convert (i) reciprocating motion of a piston to rotating motion of an axle or (ii) rotating motion of the axle to reciprocating motion of the piston, and further comprising at least one of:
at least one valve used in combination with a cam and at least one rod; or
at least one aperture.

21. The mechanism of claim 10, wherein the mechanism is adapted to operate as a 2-stroke engine.

22. The mechanism of claim/wherein the mechanism further comprises an input valve and an output valve, wherein the input valve and the output valve are adapted to perform the following steps:
the output valve opens to permit exhaust gas to escape;
the input valve opens and incoming working fluid under pressure forces out the remainder of the exhaust gases;
thereafter, the outlet valve closes; and
once the cylinder is at least partially filled with working fluid, the inlet valve closes.

23. The mechanism of claim 22, wherein the mechanism is further adapted such that, if the axial force exerted onto the first component is removed, the first component will recede to an initial position and the second component will be released and begin again moving between the first and the third components.

24. The mechanism of claim 10, wherein the mechanism is adapted to operate in a differential arrangement.

25. The mechanism of claim 10, wherein the mechanism is adapted to operate as a device for increasing/reducing at least one of (i) a number of rotations, (ii) a number of reciprocations, and (iii) a length of reciprocation.

26. The mechanism of claim 10, wherein the mechanism is adapted to be used in a mechanical engine coupled with an electrical engine.

27. The mechanism of claim 10, wherein the mechanism is adapted to operate in a two cylinder engine comprising two opposing cylinders.

28. The mechanism of claim 10, wherein the mechanism is adapted to operate in a piston engine cylinder comprising a first cylinder.

29. The mechanism of claim 28, wherein the first cylinder comprises the first and the third components functioning as stators and the second component functioning as a rotor, connected to an axis, wherein the stators are connected firmly to a common body, wherein the rotor operates as the piston and a working fluid flows between the stators, the rotor and the common body.

30. The mechanism of claim 28, wherein the mechanism is further adapted to operate in a two cylinder, double effect piston engine, further comprising a second cylinder.

31. The mechanism of claim 6, further comprising a cover covering the piston.

32. The mechanism of claim 7, wherein the cylindrical piston is a hollow piston connected to the second component, wherein the first aperture comprises a piston aperture on a surface of the piston and the second aperture comprises a liner aperture on a surface of the liner, allowing for the periodic fluidic communication between the interior of the piston and the exterior of liner.

33. The mechanism of claim 10, wherein when the crests of the surface of the first component are in contact with the crests of the surface of the second component, the surfaces of the first component and the second component are in symmetry to a plane connecting together their points of contact, wherein, in this location, the crests of the surface of the third component are in contact with the valleys of the opposing surface of the second component and the crests of the opposing surface of the second component are in contact with the valleys of the surface of the third component.

34. The mechanism of claim 13, further comprising a cover covering the piston.

35. The mechanism of claim 10, wherein the mechanism is adapted to operate in a clutch arrangement.

36. The mechanism of claim 35, further comprising:
an axis connected through a sliding spline to the second component functioning as rotor;
a transfer component firmly connected to the third component; and
an additional mechanism adapted to exert an axial force onto the first component, forcing the first and the third components to approach one another such that the second component is immobilized between the first and third components, such that rotation of the axis is transferred in its full effect to the transfer component.

37. The mechanism of claim 24, further comprising:
a first section comprising:
a second component functioning as a rotor and connected to an axis by a sliding spline;
a first component;
a third component; and
a mechanism exerting a force on the first component in order for the first component to approach the third component, thereby entrapping and immobilizing the second component between the first and the third components such that the third component is engaged and moves simultaneously with the axis; and a second section being a duplicate and mirror image of the first section, such that the first and second sections are symmetric to each other.

38. The mechanism of claim 37, wherein the third component of the first section and the duplicate thereof of the second section are each connected firmly to a gearwheel and moved by a second axis through a cooperating gearwheel such that, for as long as a resistance to motion of the axis of the first section and the duplicate thereof of the second section is the same, the second component of the first section remains in engagement with the third component of the first section and the duplicates thereof of the second section do that same and the rotation of the gearwheel is transferred to its full effect to the axis of the first section and the duplicate thereof of the second section.

39. The mechanism of claim 38, wherein the mechanism is further adapted such that if the resistance on the axis of the first section becomes higher relative to the duplicate thereof of the second section, the corresponding first component will recede slightly, the corresponding second component will be released and begin to move between the first and the third component and the number of rotations of the corresponding axis will be reduced until the balance of the resistances of the axis of the first section and the duplicate thereof of the second section is restored and their number of rotations equalizes.

40. The mechanism of claim 25, comprising:
a first mechanism having n1 number of crests/valleys, wherein the first and third components are static and mounted firmly on a body and the second component functions is firmly connected to a piston, rotating and reciprocating axially and moving by an axis with a sliding spline; and
a second mechanism connected coaxially to the first mechanism via the axis and a coupler with wedges, the second mechanism having a different number of crests/valleys n2≠n1 than the first mechanism.

41. The mechanism of claim 25, comprising:
a first mechanism having n1 number of crests/valleys, wherein the first and third components are static and mounted firmly on a body and the second component functions is firmly connected to a piston, rotating and reciprocating axially and moving by an axis with a sliding spline; and
a second mechanism connected coaxially to the first mechanism via the axis and a coupler with wedges, the second mechanism having a different number of crests/valleys n2≠n1 than the first mechanism.

42. The mechanism of claim 25, comprising:
a first mechanism having l1 length of reciprocation, wherein the first and third components are static and mounted firmly on a body and the second component is firmly connected to a piston, rotating and reciprocating axially and moving by an axis with a sliding spline; and
a second mechanism connected coaxially to the first mechanism via the axis and a coupler with wedges, the second mechanism having a different length of reciprocation l2≠l1 than the first mechanism.

43. The mechanism of claim 26, wherein the mechanical engine comprises two opposing engines.

44. The mechanism of claim 43, wherein axes of cylinders of the two similar engines coincide and bodies of the two similar engines are mounted coaxially on a body of the electrical engine, wherein the axes of the two similar engines are adapted to operate as a rotor axis of the electric engine, such that the two similar engines and the electrical engine are synchronized relative to each other, such that pistons of the two similar engines move in opposing directions in order to balance out the inertial forces of reciprocation.

45. The mechanism of claim 27, wherein each of the two cylinders operates with a pair of components with surfaces transforming motion on their adjacent sides, wherein the two cylinders are coaxial and mounted in a mirror-image arrangement with the components moving in opposing directions functioning as pistons for balancing the inertial forces of reciprocation, wherein each of the cylinders comprises the first element functioning as a stator and the second component functioning as a rotor and connected firmly to the piston, wherein the stators are connected firmly relative to each other and with a common body, wherein each rotor comprises a toothed surface cooperating with one gearwheel of a pair of gearwheels mounted on a common axis parallel to a longitudinal axis of the cylinders, wherein the pair of gearwheels synchronizes the rotors and transfers motion to the common axis, wherein a force is exerted on the pistons as they move between TDC and BDC.

46. The mechanism of claim 45, wherein the force is due to a pressure of a working fluid and/or a pulling spring, thereby keeping the surfaces of the rotors in contact with the corresponding stators.

47. The mechanism of claim 46, wherein the pulling spring connects the pistons to each other via apertures on the stators and is responsible for their recovery, keeping the rotors in continuous contact with the corresponding stators, thus assuring its synchronization.

48. The mechanism of claim 30, wherein the first and second cylinders are coaxial, mounted in a mirror-image arrangement, with components moving in opposing directions to balance the inertial forces of reciprocation, wherein each of the first and second cylinders comprises the first and the third components functioning as stators and the second component functioning as a rotor, moving from a common axis coinciding with a cylinder axis of the piston engine, wherein the stators are connected firmly to a common cylindrical liner-body and to each other, wherein the rotor operates as a piston and a working fluid flows between the stators, the rotor and the cylindrical liner-body.

* * * * *